United States Patent
Kasamatsu et al.

(10) Patent No.: US 7,949,018 B2
(45) Date of Patent: May 24, 2011

(54) MODE-LOCKED SOLID-STATE LASER APPARATUS

(75) Inventors: Tadashi Kasamatsu, Ashigarakami-gun (JP); Shogo Yamazoe, Ashigarakami-gun (JP); Makio Usui, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/488,236

(22) Filed: Jun. 19, 2009

(65) Prior Publication Data

US 2009/0316735 A1    Dec. 24, 2009

(30) Foreign Application Priority Data

Jun. 20, 2008  (JP) .................. 2008-161232

(51) Int. Cl.
*H01S 3/098* (2006.01)
(52) U.S. Cl. ............... 372/18; 372/11; 372/30; 372/108
(58) Field of Classification Search .................... 372/11, 372/18, 30
See application file for complete search history.

(56) References Cited

U.S. PATENT DOCUMENTS

| | | | |
|---|---|---|---|
| 6,081,379 A | 6/2000 | Austin et al. | |
| 7,106,764 B1 | 9/2006 | Weingarten et al. | |
| 2007/0297464 A1 | 12/2007 | Adachi et al. | |

FOREIGN PATENT DOCUMENTS

| | | | |
|---|---|---|---|
| EP | 2 042 893 A2 | 4/2009 | |
| JP | 02-023302 A | 1/1990 | |
| JP | 11-168252 A | 6/1999 | |
| JP | 2000-138407 A | 5/2000 | |
| WO | 00/11501 A1 | 3/2000 | |

OTHER PUBLICATIONS

F. Brunner, et al., "Diode-pumped femtosecond Yb:KGd(WO$_4$)$_2$ laser with 1.1-W average power", Optics Letters, Aug. 2000, pp. 1119-1121, vol. 25, No. 15.

C. Hönninger, et al., "Q-switching stability limits of continuous-wave passive mode locking", Journal of the Optical Society of America B, Jan. 1999, pp. 46-56, vol. 16, No. 1.

Takunori Taira, et al., "Modeling of quasi-three-level lasers and operation of cw Yb:YAG lasers", Applied Optics, 1997, pp. 1867-1874, vol. 36, No. 9.

Robert Szipöcs, et al., "Chirped multilayer coatings for broadband dispersion control in femtosecond lasers", Optics Letters, Feb. 1994, pp. 201-203, vol. 19, No. 3.

(Continued)

*Primary Examiner* — Dung T Nguyen
(74) *Attorney, Agent, or Firm* — Sughrue Mion, PLLC

(57) ABSTRACT

In a mode-locked laser-diode-excited laser apparatus: a solid-state laser medium is arranged at a distance of at most twice the Rayleigh range from a saturable absorbing mirror with a depth of absorbing modulation of at least 0.4%; the total intracavity dispersion is smaller than zero and makes oscillating light have such a pulse bandwidth that the saturable absorbing mirror can suppress a background pulses other than soliton pulses repeated with a fundamental repetition period, and the magnitude of the total intracavity dispersion has a predetermined relationship with a pulse width of the oscillating light; and an output mirror is a negative-dispersion mirror being constituted by three or more multilayer mirrors and cavity layers arranged at predetermined intervals between the three or more multilayer mirrors, and causing a mirror dispersion of $-3000\ fsec^2$ to $-600\ fsec^2$ and realizes a reflectance of 97% to 99.5%.

16 Claims, 19 Drawing Sheets

OTHER PUBLICATIONS

Jürgen Kuhl, et al., "Compression of Femtosecond Optical Pulses with Dielectric Multilayer Interferometers", IEEE Transactions on Quantum Electronics, Jan. 1986, pp. 182-185, vol. QE-22, No. 1.

R. Paschotta, et al., "Passive mode locking of thin-disk lasers: effects of spatial hole burning", Applied Physics B, 2001, pp. 267-278, vol. 72, No. 3.

B. Braun, et al., "Continuous-wave mode-locked solid-state lasers with enhanced spatial hole burning", Applied Physics B, 1995, pp. 429-437, vol. 61, No. 5.

F.X. Kärtner, et al., "Continuous-wave mode-locked solid-state lasers with enhanced spatial hole burning", Applied Physics B, 1995, pp. 569-579, vol. 61, No. 6.

Norman Hodgson, et al., "Optical Resonators: Fundamentals, Advanced Concepts and Applications", Springers, 2007, pp. 214-223.

A. Shirakawa, et al., "Diode-pumped mode-locked $Yb^{3+}:Y_2O_3$ ceramic laser", Optics Express, 2003, pp. 2911-2916, vol. 11, No. 22.

G. J. Spuhler, et al. "Soliton mode-locked Er:Yb:glass laser", Optics Letters, Feb. 2005, pp. 263-265, vol. 30, No. 3.

EP Communication, dated Sep. 30, 2009, issued in corresponding EP Application No. 09008087.0, 9 pages.

Nd:glass(G=0.03)

CONCRETE EXAMPLE 3

CONCRETE EXAMPLE 3

CONCRETE EXAMPLE 7

CONCRETE EXAMPLE 7

MODE-LOCKED SOLID-STATE LASER APPARATUS

BACKGROUND OF THE INVENTION

1. Field of the Invention

The present invention relates to a solid-state laser apparatus, and in particular to a small-sized, mode-locked solid-state laser apparatus which has high output power, and enables highly efficient, short-pulse generation.

2. Description of the Related Art

Conventionally, efforts of developing solid-state lasers in which a solid-state laser medium (e.g., a laser crystal, ceramic substance, glass, or the like) doped with rare-earth ions or transition-metal ions is excited with a semiconductor laser (laser diode (LD)) as an excitation light source have been actively made. Among others, a wide variety of applications of the short-pulse lasers, which emit the so-called short light pulses (having the durations on the order of picoseconds to femtoseconds), have been searched for and proposed, and part of such applications have been put into practical use after verification.

In the short-pulse lasers, the short light pulses are generated by an operation called mode locking. The mode locking is a technique of making a great number of longitudinal-mode laser oscillations in phase (i.e., making the phase differences between the longitudinal-mode laser oscillations zero) so as to produce pulses having very small durations in the time domain by multimode interference between the longitudinal-mode laser oscillations. In particular, for the solid-state lasers, the mode locking using the semiconductor saturable absorbing mirror (SESAM) is advantageous since the SESAM can realize solid-state lasers which are simple in structure, low in cost, and small in size, and the mode locking automatically starts in the solid-state lasers using the SESAM. Therefore, efforts of studying and developing the mode locking using the SESAM have been vigorously made.

Especially, the soliton mode locking, which is a type of mode locking, enables generation of pulses having the durations on the order of femtoseconds by a combination of negative group-velocity dispersion in the laser resonator and self-phase modulation, which mainly occurs in the laser medium. More specifically, in the soliton mode locking, the SESAM starts the mode locking and maintains and stabilizes generation of pulses, and the negative group velocity dispersion and the self-phase modulation are balanced so as to produce soliton pulses and steepen the mode-locked pulses. Thus, the soliton mode locking enables stable pulse generation. (The soliton mode locking is defined, for example, in F. Brunner et al., "Diode-pumped femtosecond Yb:KGd(WO$_4$)$_2$ laser with 1.1-W average power", Optics Letters, Vol. 25, No. 15, pp. 1119-1121, 2000, and C. Hönninger et al., "Q-switching stability limits of continuous-wave passive mode locking", Journal of the Optical Society of America B, Vol. 16, No. 1, pp. 46-56, 1999.)

The solid-state laser apparatus realizing the soliton mode locking is basically configured by arranging in a resonator a solid-state laser medium, a saturable absorbing mirror, and a negative dispersion element (negative group-velocity dispersion element).

FIG. 25 illustrates a typical configuration of a conventional mode-locked, Yb-doped solid-state laser, which is disclosed in the Brunner reference, where the solid-state laser medium is Yb:KGd(WO$_4$)$_2$. In FIG. 25, reference number 80 denotes a pair of excitation light sources, 81 denotes a pair of input optical systems, 83 denotes a solid-state laser medium, M$_1$ and M$_2$ denote a pair of concave mirrors, 84 denotes a concave mirror, 85 denotes an SESAM, 86 and 87 denote a pair of prisms, 88 denotes knife-edge plates, and 89 denotes an output coupler. The pair of excitation light sources 80 emit excitation light having the wavelength of, for example, 980 nm. The input optical systems 81 are respectively arranged in association with the excitation light sources 80. The concave mirrors M$_1$ and M$_2$ have a curvature radius of, for example, 20 cm, and constitute a resonator. The concave mirror 84 has a curvature radius of 20 cm. The prisms 86 and 87 are made of, for example, SF10 glass. The output coupler 89 has a transmittance of, for example, 4.3%.

Generally, in the mode-locked solid-state laser apparatuses having a configuration as above, the beam in resonator is condensed by each of the concave mirrors M$_1$, M$_2$, and 84 in order to reduce the spot size (i.e., the mode radius $\omega_L$) of the oscillating light in the laser medium and the spot size (i.e., the mode radius $\omega_A$) at the SESAM. The spot sizes in the laser medium and the SESAM are reduced for the first purpose of lowering the threshold for laser oscillation (laser oscillation threshold) and the second purpose of satisfying a condition for soliton mode locking.

The first purpose (of lowering the laser oscillation threshold) is explained below.

The laser oscillation threshold P$_{th}$ is expressed by the formula, $$P_{th} = \frac{\pi h \nu_P (\omega_L^2 + \omega_P^2)}{4\sigma \tau \eta_a (f_1 + f_2)} (L_i + T_{OC} + 2f_1 \sigma N_0 l_s) \qquad (1)$$

where $\omega_L$ is the beam radius of the oscillating light in the solid-state laser medium, $\omega_P$ is the beam radius of the excitation light in the solid-state laser medium, $h\nu_P$ is the photon energy of the excitation light, $\sigma$ is the stimulated-emission cross section of the solid-state laser medium, $\tau$ is the lifetime of the upper level, $\eta_a$ is the absorption efficiency, $f_1$ is the filling factor of the lower level, $f_2$ is the filling factor of the upper level, $L_i$ is the internal loss of the resonator, $T_{OC}$ is the transmittance of the output mirror, $N_0$ is the doping concentration of the rare-earth ions, and $l_s$ is the crystal length. (See T. Taira et al., "Modeling of quasi-three-level lasers and operation of cw Yb:YAG lasers", Applied Optics, Vol. 36, No. 9, pp. 1867-1874, 1997.)

It is possible to understand, on the basis of the formula (1), that the laser oscillation threshold can be lowered by reducing the beam radius $\omega_P$ of the excitation light and the radius $\omega_L$ of the oscillating light in the solid-state laser medium.

The Hönninger reference reports that a Q-switching operation is mixed in the mode locking operation (i.e., a Q-switched mode locking occurs) under a certain condition in a soliton-mode-locked laser. When the Q-switched mode locking occurs, mode-locked pulses (having a frequency of 10 MHz to 1 GHz and a width on the order of picoseconds to femtoseconds) are superimposed on long Q-switched pulses (having a frequency of 1 kHz to 100 kHz and a width on the order of microseconds to nanoseconds). However, generally, the Q-switched mode locking is undesirable in the applications other than the energetic use because of the instability in the output, pulse width, and pulse period. According to the Hönninger reference, a condition for preventing the Q-switching operation during the soliton mode locking by use of the saturable absorbing mirror can be expressed by the inequality, $$F_{sat,L} \cdot A_{eff,L} \cdot g \cdot K^2 E_P^3 + E_P^2 > F_{sat,L} \cdot A_{eff,L} \cdot F_{sat,A} \cdot A_{eff,A} \Delta R, \qquad (2)$$

where $E_P$ is the pulse energy inside the resonator, $\Delta R$ is the depth of the absorbing modulation in the saturable absorbing mirror, $F_{sat,A}$ is the saturation fluence in the saturable absorbing mirror, $F_{sat,L}$ ($=h\nu/\sigma$) is the saturation fluence in the laser medium, $h\nu$ is the photon energy of the laser light, $A_{eff,A}$ ($=\pi\omega_A^2$) is the oscillated-light-beam cross section at the saturable absorbing mirror, $A_{eff,L}$ ($=\pi\omega_L^2$) is the oscillated-light-beam cross section in the laser medium, and g is the laser gain in the laser medium. The factor K in the inequality (2) can be expressed as, $$K = \frac{4\pi n_2 l_S}{|D| A_{eff,L} \lambda_0 \Delta \nu_G} \frac{0.315}{1.76} \quad (3)$$

where $n_2$ is the nonlinear refractive index of the laser medium, D is the group-velocity dispersion (D<0) occurring in a round trip in the entire resonator, $\lambda_0$ is the central wavelength of the oscillating light, and $\Delta\nu_G$ is the gain bandwidth. It is known that the so-called CW (continuous-wave) mode locking, which is free from Q-switching instability, is realized when the pulse energy $E_P$ satisfying the condition expressed by the inequality (2) is satisfied in a resonator by reducing the oscillated-beam cross sections $A_{eff,A}$ and $A_{eff,L}$. The mode-locking threshold value can be obtained as a solution $E_P$ of an equation expressed by replacing the inequality sign in the inequality (2) with an equal sign. In other words, when the pulse energy $E_P$ inside the resonator exceeds the mode-locking threshold value, the inequality (2) is satisfied.

The two conditions for the laser oscillation threshold and the (CW) mode-locking threshold value which are explained above require reduction of the oscillated-beam cross sections $A_{eff,A}$ and $A_{eff,L}$ in the laser medium and the SESAM. In many of the conventional mode-locked solid-state lasers, a pair of concave mirrors are arranged on both sides of the laser medium and near the SESAM so as to condense the beam. (In the example of FIG. 25, the curvature radii of the concave mirrors $M_1$ and $M_2$ are normally 100 to 200 nm.)

Normally, the concave mirrors $M_1$ and $M_2$ on both sides of the laser medium 83 are arranged at distances approximately halves of the curvature radii of the concave mirrors $M_1$ and $M_2$ from the laser medium 83, and the concave mirror 84 near the SESAM 85 is arranged at a distance approximately half of the curvature radius of the concave mirror 84 from the SESAM 85. Therefore, when the curvature radii of the concave mirrors are 100 to 200 mm, the necessary dimensions of the part of the solid-state laser containing the concave mirrors $M_1$ and $M_2$ and the laser medium 83 and the part of the solid-state laser containing the concave mirror 84 and the SESAM 85 are approximately 150 to 300 mm. Thus, in consideration of the spaces for arrangement of the other components such as the negative dispersion elements, the necessary length of the resonator becomes approximately 500 to 1000 mm. That is, the size of the solid-state laser apparatus becomes large. In the configuration of FIG. 25, the pair of prisms 86 and 87, which are distanced by 450 mm, cause negative dispersion. However, generally, solid-state laser apparatuses containing a one-meter class resonator are hard to stably operate. Therefore, the stability of the laser oscillation in the conventional solid-state laser apparatuses is low. In addition, since the conventional solid-state laser apparatuses are constituted by a great number of optical components, the cost of the conventional solid-state laser apparatuses is high.

In the above circumstances, downsizing of the mode-locked solid-state laser apparatuses is demanded for increasing the stability of the laser oscillation.

U.S. Pat. No. 7,106,764 (hereinafter referred to as U.S. Pat. No. 7,106,764) proposes a small-sized solid-state laser apparatus 100 as illustrated in FIG. 26. In the solid-state laser apparatus 100, a resonator is constituted by a solid-state laser medium 101 and a SESAM 102. The solid-state laser medium 101 and the SESAM 102 are arranged through a ring 108 so that a predetermined gap 103 is produced between the solid-state laser medium 101 and the SESAM 102. The gap 103 has the function of a GTI (Gires-Tournois interferometer) and causes negative dispersion. An end surface 104 of the laser medium 101 is a curved surface, and is coated so as to behave as an output mirror 105. Excitation light 106 is inputted and output light 107 is outputted through the output mirror 105.

Japanese Unexamined Patent Publication No. 11 (1999)-168252 (hereinafter referred to as JP11-168252A) proposes provision of a chirped-mirror coating (negative-dispersion coating) on a laser medium, a saturable absorbing mirror, or an output mirror. For example, JP11-168252A proposes a small-sized laser apparatus 110 as illustrated in FIG. 27. In the laser apparatus 110, a saturable absorbing mirror 112 is formed on an end surface of a laser medium 111 by coating, so that a resonator is formed between the saturable absorbing mirror 112 and a chirped mirror 113, which is a negative-dispersion mirror. Excitation light 115 is generated by a semiconductor laser 114 and inputted into the laser medium 111, and output light 116 is outputted through the chirped mirror 113.

As explained above, U.S. Pat. No. 7,106,764 proposes downsizing of a solid-state laser apparatus by close arrangement of the solid-state laser medium and the SESAM, and JP11-168252A proposes downsizing of a solid-state laser apparatus by reduction of the number of optical components. In JP11-168252A, the number of optical components is reduced by producing the saturable absorbing mirror 112 by coating on the solid-state laser medium, and arranging the solid-state laser apparatus so that the negative-dispersion mirror is also used as the output mirror.

Although, generally, one or a combination of a pair of prisms, a pair of diffraction gratings, a negative-dispersion mirror, and the like is used as the negative dispersion element, the configuration in which the negative-dispersion mirror is also used as the output mirror (as disclosed in JP11-168252A) is desirable from the viewpoint of downsizing.

The chirped mirror and the GTI mirror are known to be a negative-dispersion mirror. For example, JP11-168252A discloses a chirped mirror which makes negative dispersion compensation (compensation with a negative dispersion) by taking advantage of the difference in light penetration between the longer wavelengths and shorter wavelengths. The GTI mirror makes negative dispersion compensation by taking advantage of optical interference occurring between a total-reflection mirror and a partial-reflection mirror.

In a typical example of the chirped mirror, high-index layers having relatively high refractive indexes and low-index layers having relatively low refractive indexes are alternately laminated in such a manner that the optical thicknesses of the high-index layers and the optical thicknesses of the low-index layers linearly vary along the thickness direction. (See, for example, R. Szipbös et al., "Chirped multilayer coatings for broadband dispersion control in femtosecond lasers", Optics Letters, Vol. 19, No. 3, pp. 201-203, 1994.)

On the other hand, the GTI mirror is characterized by having a resonant structure inside a dielectric multilayer film. (See, for example, J. Kuhl and J. Heppner, "Compression of Femtosecond Optical Pulses with Dielectric Multilayer Interferometers", IEEE Transactions on Quantum Electronics, Vol. QE-22, No. 1, pp. 182-185, 1986.) In addition, a GTI mirror having a double-GTI structure with two cavity layers arranged inside a multilayer film (as disclosed in Japanese Unexamined Patent Publication No. 2002-528906 (hereinafter referred to as JP2002-528906A)) and a GTI mirror having a resonant structure in which no cavity layer is arranged and the optical thicknesses of multiple layers constituting a multilayer film vary in accordance with a certain rule (as disclosed in International Patent Publication No. WO00/11501 (hereinafter referred to as WO001501A1) have been proposed.

Further, Japanese Unexamined Patent Publication No. 2 (1990)-023302 (hereinafter referred to as JP2-023302A) proposes a dielectric multilayer-film stack which compensates for the third-or higher-order dispersion as well as the second-order dispersion. The dielectric multilayer-film stack is formed by stacking two or more dielectric multilayer films in which two or more index layers having different refractive indexes are alternately laminated, and the dielectric multilayer films have respectively different central frequencies. Japanese Unexamined Patent Publication No. 2000-138407 (hereinafter referred to as JP2000-138407A) proposes a multilayer mirror in which the outermost layers have refractive indexes respectively lower than the layers immediately below the outermost layers, and which exhibits a reflectance of 95% or higher in the visible wavelength range and causes negative group-velocity dispersion.

As explained above, in order to realize downsizing of a mode-locked solid-state laser apparatus, it is possible to consider the close arrangement of the solid-state laser medium and the SESAM and the use of the negative-dispersion mirror as an output mirror.

However, the conventional techniques explained above have the following problems.

(a) Although JP11-168252A proposes the use of the negative-dispersion mirror as the output mirror, and the negative-dispersion mirror is produced by chirped-mirror coating (having a negative dispersion function), JP11-168252A does not concretely disclose details of the negative-dispersion mirror (such as the optical transmittance, the amount of dispersion, the dielectric films constituting the negative-dispersion mirror, and the like) for use as the output mirror. That is, JP11-168252A does not disclose information necessary for realizing the negative-dispersion mirror which is produced by chirped-mirror coating and can be used as the output mirror.

(b) Although JP2000-138407A reports that the frequency chirp can be compensated for by arranging a dielectric multilayer film on the output mirror, the reflectance of the dielectric multilayer film disclosed in JP2000-138407A is 99.9% or higher, i.e., approximately 100%. That is, almost no output light can be outputted through such an output mirror. Therefore, the dielectric multilayer film disclosed in JP2000-138407A does not have a sufficient function of an output mirror.

(c) Since the magnitudes of negative dispersion caused by the commercially available negative dispersion elements are tens to hundreds of square femtoseconds, it is necessary to arrange more than one negative dispersion element in the resonator for making sufficient negative dispersion compensation. Therefore, it is difficult to achieve satisfactory downsizing and stabilization of the solid-state laser apparatus.

(d) The solid-state laser apparatuses in which the saturable absorbing mirror (as a reflection mirror) is arranged in close vicinity to or in contact with the laser medium as disclosed in U.S. Pat. No. 7,106,764 or JP11-168252A have the following problems.

As indicated in R. Paschotta et al., "Passive mode locking of thin-disk lasers: effects of spatial hole burning", Applied Physics B, Vol. 72, No. 3, pp. 267-278, 2001, B. Braun et al., "Continuous-wave mode-locked solid-state lasers with enhanced spatial hole burning", Applied Physics B, Vol. 61, No. 5, pp. 429-437, 1995, and F. X. Kärtner et al., "Continuous-wave mode-locked solid-state lasers with enhanced spatial hole burning", Applied Physics B, Vol. 61, No. 6, pp. 569-579, 1995, it is known that the spatial hole burning differently occurs in the laser medium (as the gain medium) according to the position along the optical axis, is coupled to the mode locking phenomenon, and affects the stability of the mode locking.

The phase of the electric field of the optical wave jumps at the reflection mirror surfaces of the resonator, and nodes of the electric field (at which the electric field strength is zero) exist at the reflection mirror surfaces. In the case where the laser medium is arranged in close vicinity of a reflection mirror surface, the intensity of the laser wave has a stripe-like spatial distribution in the laser medium because of the phase jump at the reflection mirror surface. This phenomenon is the spatial hole burning.

The Paschotta reference reports that in the case where the laser medium is arranged in close vicinity of a reflection mirror, a dip is produced in a gain spectrum, and makes the soliton pulses traveling between the reflection surfaces in the resonator unstable. Specifically, since the hole burning effect is relatively strongly manifested in the vicinity of the reflection mirror, the gain spectrum (in the frequency domain) of the laser pulses traveling between the reflection surfaces in the resonator (which are soliton pulses having a relatively wide bandwidth) is also affected, and the gain is preferentially imparted to undesirable phenomena (such as generation of shifted pulses, double pulses, and continuous background) competing the desired pulses. Therefore, the desired soliton pulses lose in the competition, and the above undesirable phenomena make the operation of the solid-state laser apparatus unstable. Consequently, in the case where the saturable absorbing mirror (as a reflection mirror) is arranged in close vicinity to or in contact with the laser medium as disclosed in U.S. Pat. No. 7,106,764 or JP11-168252A, it is possible to consider that the spatial hole burning conspicuously occurs, and the generation of soliton pulses becomes extremely unstable. However, neither U.S. Pat. No. 7,106,764 nor JP11-168252A mentions the influence of the spatial hole burning on the mode stability, and teaches a means for realizing the mode stability.

As explained above, various proposals for downsizing of the mode-locked solid-state laser apparatuses have been conventionally made, no condition for stably generating soliton pulses in downsized solid-state laser apparatuses has been definitely proposed. In addition, no negative-dispersion mirror which can make sufficient negative dispersion compensation by itself and can also operate as an output mirror has been reported. That is, no small-sized, mode-locked solid-state laser apparatus which satisfactorily operates has been conventionally realized.

SUMMARY OF THE INVENTION

The present invention has been developed in view of the above circumstances.

The object of the present invention is to provide a small-sized, mode-locked solid-state laser apparatus which can be manufactured at low cost, can stably operate, and can realize continuous-wave (CW) mode locking.

In order to accomplish the above object, the present invention is provided. According to the present invention, there is provided a mode-locked solid-state laser apparatus comprising: a resonator having an output mirror at one end of the resonator; a solid-state laser medium arranged in the resonator; and a saturable absorbing mirror. The solid-state laser medium is arranged at a distance equal to or smaller than twice the Rayleigh range from the saturable absorbing mirror; the saturable absorbing mirror has a depth of absorbing modulation equal to or greater than 0.4%; the mode-locked solid-state laser apparatus is configured to impart a total intracavity dispersion D to light having a predetermined wavelength during a round trip of the light in the resonator, where the total intracavity dispersion D is smaller than zero and makes the light have such a pulse bandwidth that the saturable absorbing mirror can suppress operational modes other than operational modes generating soliton pulses repeated with a fundamental repetition period, and the absolute value |D| of the total intracavity dispersion D has a relationship expressed by the equation, $$\tau_P = \frac{1.76|D|\lambda_0 A_{\it{eff,L}}}{4\pi n_2 l_S} \frac{1}{E_P}, \quad (4)$$

with a pulse width $\tau_P$ and a central wavelength $\lambda_0$ of the light, a beam cross section $A_{\it{eff,L}}$ of the light in the solid-state laser medium, a nonlinear refractive index $n_2$ and a crystal length $l_S$ of the solid-state laser medium, pulse energy $E_P$ in the resonator; the output mirror is a negative-dispersion mirror which has a dielectric multilayer structure being formed on a substrate, including three or more multilayer mirrors and cavity layers, and having a thickness, the cavity layers are arranged at predetermined intervals across the entire thickness of the dielectric multilayer structure so that each of the cavity layers is sandwiched between two of the three or more multilayer mirrors and causes resonance of the light between the two of the three or more multilayer mirrors, and the negative-dispersion mirror causes a mirror dispersion of $-3000$ fsec$^2$ to $-600$ fsec$^2$ (i.e., equal to or greater than $-3000$ fsec$^2$ and equal to or smaller than $-600$ fsec$^2$) and realizes a reflectance of 97% to 99.5% (i.e., equal to or greater than 97% and equal to or smaller than 99.5%). The beam cross section $A_{\it{eff,L}}$ of the light in the solid-state laser medium can be expressed as $\pi \omega_L^2$, where $\omega_L$ is the radius of the beam of the light in the solid-state laser medium.

The present inventors have made investigations on downsizing of mode-locked solid-state laser apparatuses, and found that mode-locked soliton pulses can be generated by arranging a laser medium at a distance not exceeding twice the Rayleigh range from an SESAM even in configurations in which the beam waist is not formed in the laser medium.

In addition, the present inventors have also found that certain limitations should be imposed on the depth of absorbing modulation in the saturable absorbing mirror and the total dispersion in the resonator in order to stabilize the mode-locked operations in small-sized mode-locked solid-state laser apparatuses, and the present inventors have clearly indicated the limitations. That is, the limitations on the depth $\Delta R$ of absorbing modulation in the saturable absorbing mirror and the total intracavity dispersion D caused in the light during a round trip of the light in the resonator (which is hereinafter referred to as the total intracavity dispersion D) have been found as a result of close investigation on the stability of the mode locking.

Further, the present inventors have found that in order to use a negative-dispersion mirror as an output mirror (or use an output mirror as a negative-dispersion mirror) for the downsizing of a mode-locked solid-state laser apparatus, the negative-dispersion mirror is required to have such a reflectance as to allow output of laser pulses, and is also required to cause such a total intracavity dispersion to realize stable operation.

The Rayleigh range is a quantity defined as $z_R = \pi \omega_A^2/\lambda$, and is the distance along the optical axis from the beam waist to a location at which the radius of the beam of the oscillating light is $\sqrt{2}$ times the radius $\omega_A$ at the beam waist. In addition, the condition that "the solid-state laser medium is arranged at a distance equal to or smaller than twice the Rayleigh range from the saturable absorbing mirror" allows the arrangement in which the distance is zero, i.e., the saturable absorbing mirror may be arranged in contact with the solid-state laser medium. Further, the "operational modes other than operational modes which generate soliton pulses repeated with a fundamental repetition period" means, for example, the modes of operation in which pulses (such as double pulses, continuous-wave background, and the like) competing with the fundamental soliton pulses repeated with the fundamental repetition period are generated as illustrated in FIG. 2.

TABLE 1

| | Central Frequency | Pulse Energy (Arbitrary Unit) | Pulse Bandwidth (Frequency) |
| --- | --- | --- | --- |
| Soliton Pulse | $v_0$ | 1 | $\Delta v_P$ |
| Frequency-shifted Pulse | $v_0 - \delta v_{shift}$ | 1 | $\Delta v_P$ |
| CW Background | $v_0 - \delta v_{CW}$ | — | Narrow Bandwidth |
| Double Pulse | $v_0 - \delta v_{double}$ | ½ | $\Delta v_P/2$ |

FIG. 2 illustrates examples of spectra (in the frequency domain) and the waveshapes of the fundamental soliton pulses repeated with the fundamental repetition period, the frequency-shifted pulses, the double pulses, and the continuous-wave (CW) background, and Table 1 indicates the central frequencies, pulse energies, and pulse bandwidths of the soliton pulses repeated with the fundamental repetition period, the frequency-shifted pulses, the CW background, and the double pulses. The frequency-shifted pulses with which the soliton pulses repeated with the fundamental repetition period compete have a central frequency which is shifted by $\delta v_{shift}$ from the central frequency of the soliton pulses repeated with the fundamental repetition period, although the frequency-shifted pulses have the same pulse bandwidth and pulse energy as the soliton pulses. The CW background with which the soliton pulses repeated with the fundamental repetition period compete is a continuous-wave component which does not have a pulse-like waveshape in the time domain, and has a very narrow bandwidth in the frequency domain. The double pulses with which the soliton pulses repeated with the fundamental repetition period compete are a series of pulses the pulse energies of which are halves of the pulse energy of the soliton pulses repeated with the fundamental repetition period, and the pulse bandwidths of which are half of the pulse bandwidth of the soliton pulses repeated with the fundamental repetition period. Although no frequency shift from the soliton pulses repeated with the fundamental repetition period is illustrated in the spectra for the double pulses and the CW background in FIG. 2 for simple illustration, actually, the frequencies of the double pulses and the CW background are shifted from the soliton pulses repeated with the fundamental repetition period.

Although the aforementioned "operational modes other than operational modes which generate soliton pulses repeated with a fundamental repetition period" according to the present invention include the operational modes in which the double pulses and the CW background are generated, the "operational modes other than operational modes which generate soliton pulses repeated with a fundamental repetition period" according to the present invention do not include the operational modes in which the frequency-shifted pulses are generated, since the frequency-shifted pulses cannot be suppressed by control of the depth of absorbing modulation.

Although the total intracavity dispersion D has the relationship expressed by the equation (4) with the pulse width $\tau_P$ (which is inversely proportional to the pulse bandwidth) and the other parameters, the total intracavity dispersion D is set to a value in a range which is determined on the basis of such a pulse bandwidth that the pulses (such as the double pulses and the CW background) generated by the spatial hole burning in competition with the desired soliton pulses can be suppressed with the depth of absorbing modulation at the saturable absorbing mirror which is set to a value equal to or greater than 0.4%.

The negative-dispersion mirror has a dielectric multilayer structure constituted by three or more multilayer mirrors and cavity layers, and the cavity layers are arranged at predetermined intervals across the entire thickness of the dielectric multilayer structure. The expression "arranged at predetermined intervals across the entire thickness of the dielectric multilayer structure" means that the cavity layers are substantially uniformly distributed across the entire thickness of the dielectric multilayer structure from the substrate side to the outermost side. That is, the locations of the cavity layers along the thickness direction are not concentrated in part (e.g., half) of the entire thickness of the dielectric multilayer structure.

Further, in the case where the dielectric multilayer structure includes three or more cavity layers, it is preferable that the three or more cavity layers be approximately equally spaced so that the expression "approximately equally spaced" means that the variations in the intervals between the three or more cavity layers are within ±35% of the average of the intervals between the three or more cavity layers.

Preferably, the solid-state laser apparatus according to the present invention may also have one or any possible combination of the following additional features (i) to (xxii).

(i) It is preferable that the resonator include a dichroic mirror which transmits the light and is arranged on the optical axis or on an extension of the optical axis so that when excitation light for exciting the solid-state laser medium is injected into the resonator along a direction nonparallel to the optical axis, the excitation light is reflected by the dichroic mirror and propagates along the optical axis. For example, the excitation light may be injected into the resonator along a direction perpendicular to the optical axis.

(ii) It is preferable that the solid-state laser medium be doped with a rare-earth element. In this case, the rare-earth element may be at least one of ytterbium (Yb), erbium (Er), and neodymium (Nd), and the solid-state laser medium may be one of Yb:YAG ($Y_3Al_5O_{12}$), Yb:KYW (KY $(WO_4)_2$), Yb:KGW ($KGd(WO_4)_2$), $Yb:Y_2O_3$, $Yb:Sc_2O_3$, $Yb:Lu_2O_3$, Er,Yb:glass, and Nd:glass.

(iii) It is preferable that the resonator be a linear resonator.

(iv) It is preferable that the light have a mode diameter of 100 micrometers or smaller at the beam waist when the light is oscillated in the resonator. In this specification, the diameter of a beam is defined as the diameter of the beam spread in a cross section perpendicular to the light propagation direction within which the intensity of the beam is $1/e^2$ or more of the peak intensity.

(v) In the case where the solid-state laser medium is Yb:KYW, it is preferable that the total intracavity dispersion D be equal to or greater than $-2500$ $fsec^2$ and smaller than 0 $fsec^2$.

(vi) In the case where the solid-state laser medium is Yb:KGW, it is preferable that the total intracavity dispersion D be equal to or greater than $-5750$ $fsec^2$ and smaller than 0 $fsec^2$.

(vii) In the case where the solid-state laser medium is Yb:YAG, it is preferable that the total intracavity dispersion D be equal to or greater than $-1750$ $fsec^2$ and smaller than 0 $fsec^2$.

(viii) In the case where the solid-state laser medium is $Yb:Y_2O_3$, it is preferable that the total intracavity dispersion D be equal to or greater than $-3250$ $fsec^2$ and smaller than 0 $fsec^2$.

(ix) In the case where the solid-state laser medium is $Yb:Lu_2O_3$, it is preferable that the total intracavity dispersion D be equal to or greater than $-3000$ $fsec^2$ and smaller than 0 $fsec^2$.

(x) In the case where the solid-state laser medium is $Yb:Sc_2O_3$, it is preferable that the total intracavity dispersion D be equal to or greater than $-3000$ $fsec^2$ and smaller than 0 $fsec^2$.

(xi) In the case where the solid-state laser medium is Er,Yb:glass, it is preferable that the total intracavity dispersion D be equal to or greater than $-1200$ $fsec^2$ and smaller than 0 $fsec^2$.

(xii) The preferable range of the total intracavity dispersion D is different according to the solid-state laser medium. On the other hand, the laser crystal arranged in the resonator and various coatings can generally impart a positive group-velocity dispersion to the light. Even in the case where the number of components in the resonator is minimized, the positive dispersion of +100 $fsec^2$ to +500 $fsec^2$ is imparted in total. Therefore, a negative-dispersion mirror which causes a (mirror) dispersion of $-3000$ $fsec^2$ to $-600$ $fsec^2$ can be preferably used. In addition, a quartz substrate or the like which imparts a desired positive dispersion may be inserted in a resonator, when necessary, so as to achieve the desired amount of the total intracavity dispersion D according to the solid-state laser medium.

(xiii) The length of the resonator in the mode-locked solid-state laser apparatus according to the present invention is preferably equal to or smaller than 200 mm, more preferably equal to or smaller than 100 mm, further preferably equal to or smaller than 75 mm, and yet further preferably equal to or smaller than 50 mm.

(xiv) It is preferable that the substrate of the negative-dispersion mirror have a concave surface, and the dielectric multilayer structure be arranged at the concave surface.

(xv) It is preferable that the negative-dispersion mirror cause the mirror dispersion of $-3000$ $fsec^2$ to $-600$ $fsec^2$ and realizes the reflectance of 97% to 99.5% in a wavelength range containing the predetermined wavelength and having a bandwidth equal to or greater than 10 nm.

(xvi) It is preferable that the predetermined wavelength be in a wavelength range of 1000 nm to 1100 nm.

(xvii) It is preferable that each of the cavity layers in the negative-dispersion mirror have an optical thickness equal to or greater than half of the predetermined wavelength. In addition, it is preferable that the optical thickness of each cavity layer in the negative-dispersion mirror be at most approximately ten times the predetermined wavelength. Further, it is particularly preferable that the optical thickness of each cavity layer in the negative-dispersion mirror be approximately twice to four times the predetermined wavelength.

(xviii) It is preferable that each of layers constituting the three or more multilayer mirrors in the negative-dispersion mirror have an optical thickness equal to or greater than one-eighth of the predetermined wavelength and smaller than half of the predetermined wavelength.

(xix) It is preferable that each of the three or more multilayer mirrors in the negative-dispersion mirror be constituted by high-index layers having relatively high refractive indexes and low-index layers having relatively low refractive indexes which are alternately laminated, and the total number of the high-index layers and the low-index layers in each of the three or more multilayer mirrors be five or greater.

(xx) In the mode-locked solid-state laser apparatus having the feature (xix), it is preferable that the cavity layers in the negative-dispersion mirror be formed of an identical material to one of the high-index layers and the low-index layers.

(xxi) In the mode-locked solid-state laser apparatus having the feature (xix), it is preferable that the high-index layers in the negative-dispersion mirror be formed of one of a sulfide of Zn and oxides of Ti, Zr, Hf, Nb, Al, Zn, Y, Sc, La, Ce, Pr, and Ta, or a compound or mixture containing one or a combination of a sulfide of Zn and oxides of Ti, Zr, Hf, Nb, Al, Zn, Y, Sc, La, Ce, Pr, and Ta. Specifically, it is preferable that the above compound or mixture contain as one or more main components the one or combination of a sulfide of Zn and oxides of Ti, Zr, Hf, Nb, Al, Zn, Y, Sc, La, Ce, Pr, and Ta, where the total fraction of the one or more main components is 50 weight percent or more.

(xxii) In the mode-locked solid-state laser apparatus having the feature (xix), it is preferable that the low-index layers in the negative-dispersion mirror be formed of one of an oxide of Si and fluorides of Ca, Li, Mg, Na, Th, Al, Hf, La, Y, and Zr, or a compound or mixture containing one or a combination of an oxide of Si and fluorides of Ca, Li, Mg, Na, Th, Al, Hf, La, Y, and Zr. Specifically, it is preferable that the above compound or mixture contain as one or more main components the one or a combination of an oxide of Si and fluorides of Ca, Li, Mg, Na, Th, Al, Hf, La, Y, and Zr, where the total fraction of the one or more main components is 50 weight percent or more.

The mode-locked solid-state laser apparatus according to the present invention has the following advantages.

In the mode-locked solid-state laser apparatus according to the present invention, the solid-state laser medium is arranged at a distance equal to or smaller than twice the Rayleigh range from the saturable absorbing mirror (i.e., the solid-state laser medium is arranged in close vicinity to or in contact with the saturable absorbing mirror). Therefore, the beam waist of the oscillating light is not formed in the solid-state laser medium, so that it is possible to have in the solid-state laser medium a beam cross section necessary for achieving a sufficient gain.

On the other hand, in the mode-locked solid-state laser apparatus in which the SESAM is arranged in close vicinity to or in contact with the laser medium, pulses competing with the soliton pulses preferentially acquire the gain because of the spatial hole burning. (That is, the gain advantage of the pulses competing with the soliton pulses over the soliton pulses increases.) Therefore, there is a fear that the soliton pulses cannot be stably generated. The present inventors have found that stable soliton-mode oscillation can be realized by setting the depth of absorbing modulation at the saturable absorbing mirror to a value equal to or greater than 0.4%, and setting the total intracavity dispersion D to a value realizing such a pulse bandwidth that the saturable absorbing mirror can suppress the pulses competing with the desired soliton pulses. Further, the present inventors have found that the necessary total intracavity dispersion D is negative and the necessary amount |D| of the negative total intracavity dispersion D can become thousands of square femtoseconds in some cases. The conditions imposed on the total intracavity dispersion D and the depth $\Delta R$ of absorbing modulation at the saturable absorbing mirror for stably operating the small-sized, mode-locked solid-state laser apparatus have not been conventionally known. Therefore, conventionally, it has been difficult to realize a small-sized, mode-locked solid-state laser apparatus which can stably operate. However, according to the present invention, it is possible to realize a mode-locked solid-state laser apparatus which can stably operate in a soliton mode.

Although, as JP11-168252A teaches, it is conventionally known that the size of the laser apparatus can be reduced by using a negative-dispersion mirror as an output mirror, no concrete realization of the negative-dispersion mirror which can also be used as an output mirror is conventionally known. However, in order to optimumly output laser light, the present inventors have realized a negative-dispersion mirror which exhibits the transmittance of 0.5% to 3% (i.e., the reflectance of 99.5% to 97%), and imparts the (mirror) dispersion of $-3000$ fsec$^2$ to $-600$ fsec$^2$ to the light, where the transmittance of 0.5% to 3% has been determined to be the optimum transmittance by calculation on the basis of the laser gain and the loss in the resonator, and the (mirror) dispersion of $-3000$ fsec$^2$ to $-600$ fsec$^2$ has been determined so as to satisfy the condition imposed on the total intracavity dispersion D for realizing mode locking stability.

The magnitude of the above (mirror) dispersion of $-3000$ fsec$^2$ to $-600$ fsec$^2$ according to the present invention is extremely great, compared with the conventional negative-dispersion mirror. Therefore, the negative-dispersion mirror according to the present invention can make sufficient negative dispersion compensation by itself, so that it is unnecessary to further arrange a negative dispersion element in the resonator. That is, since, according to the present invention, the negative-dispersion mirror can be used as the output mirror at one end of the resonator, the number of components of the mode-locked solid-state laser apparatus can be greatly reduced, so that the mode-locked solid-state laser apparatus can be reduced in size, and be constructed at low cost, and stably output laser light.

As explained above, according to the present invention, a condition for stably generating soliton pulses is clearly indicated, and the negative-dispersion mirror realizing the dispersion and the reflectance satisfying the condition is realized. Thus, cost reduction in manufacture of the mode-locked solid-state laser apparatus and downsizing of the mode-locked solid-state laser apparatus can be achieved. That is, it is possible to realize a highly-stable mode-locked solid-state laser apparatus having the synergetic advantages of low cost and small size.

Further, in the case where a dichroic mirror which transmits the light is arranged on the optical axis or on an extension of the optical axis so that when excitation light for exciting the solid-state laser medium is injected into the resonator along a direction nonparallel to the optical axis, the excitation light is reflected by the dichroic mirror and propagates along the optical axis, the optical system for the excitation light can be reduced in size. Therefore, the above arrangement with the dichroic mirror is particularly preferable.

DESCRIPTION OF PREFERRED EMBODIMENTS

Embodiments of the present invention are explained in detail below with reference to drawings.

1. Apparatus Configuration (FIG. 1)

Figure 1:
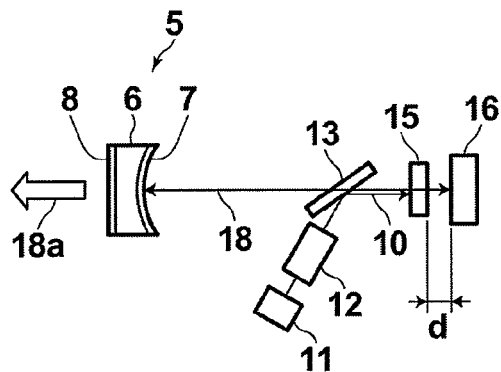
FIG. 1 is a schematic side view illustrating an exemplary configuration of a mode-locked solid-state laser apparatus according to an embodiment of the present invention.

FIG. 1 is a schematic side view illustrating an exemplary configuration of a soliton mode-locked solid-state laser apparatus according to an embodiment of the present invention. The mode-locked solid-state laser apparatus of FIG. 1 comprises a semiconductor laser 11, an excitation optical system 12, a dichroic mirror 13, a negative-dispersion mirror 5, a semiconductor saturable absorbing mirror (SESAM) 16, and a solid-state laser medium 15. The semiconductor laser 11 emits excitation light (pumping light) 10. The excitation optical system 12 externally injects the excitation light 10 into a resonator in the mode-locked solid-state laser apparatus of FIG. 1 along a direction nonparallel to the optical axis of the resonator. The dichroic mirror 13 is arranged in the resonator, and reflects the excitation light 10 toward the solid-state laser medium 15, and transmits oscillating light 18, which resonates in the resonator. The negative-dispersion mirror 5 realizes an end of the resonator, and has the function of an output mirror. The SESAM 16 realizes the other end of the resonator. That is, the resonator is constituted by the negative-dispersion mirror 5 and the SESAM 16. The solid-state laser medium 15 is arranged inside the resonator.

The solid-state laser medium 15 in the mode-locked solid-state laser apparatus of FIG. 1 is, for example, a Yb:KYW crystal. In this case, the excitation light 10 emitted from the semiconductor laser 11 has the wavelength of 980 nm, which can excite the solid-state laser medium 15. The dichroic mirror 13 reflects the excitation light 10, and transmits the oscillating light 18, which has the wavelength of 1045 nm.

The solid-state laser medium 15 is arranged in close vicinity to (or in contact with) the SESAM 16 at a distance d equal to or smaller than twice the Rayleigh range from the SESAM 16. The Rayleigh range is defined on the basis of the mode radius in the resonator (i.e., the beam radius of the oscillating light).

In the above mode-locked solid-state laser apparatus, the excitation light 10 is emitted from the semiconductor laser 11, and injected through the excitation optical system 12 into the resonator along the direction nonparallel to the optical axis of the resonator. Then, the excitation light 10 is reflected by the dichroic mirror 13 and injected into the solid-state laser medium 15, so that the solid-state laser medium 15 is excited, and light having the wavelength of 1045 nm generated by the excitation of the solid-state laser medium 15 oscillates in the resonator. Part of the oscillating light passes through the negative-dispersion mirror 5 (which also behaves as the output mirror), and is externally outputted as output light 18a. In the mode-locked solid-state laser apparatus of FIG. 1, the beam waist of the oscillating light 18 is formed only on the SESAM 16.

In the mode-locked solid-state laser apparatus according to the present invention, the output light 18a becomes pulsed light having a pulse width on the order of femtoseconds by a combined action of the negative group-velocity dispersion imparted by the negative-dispersion mirror 5 and the self-phase compensation in the solid-state laser medium 15. Specifically, the SESAM 16 starts mode locking and maintains and stabilizes pulses, and soliton pulses are generated by a balance between the group-velocity dispersion and the self-phase modulation. Thus, the mode-locked pulses are steepened, so that stable generation of soliton pulses having a pulse width on the order of femtoseconds is enabled.

2. Arrangement of Laser Medium and SESAM

As described before, the distance between the solid-state laser medium and the saturable absorbing mirror is at most twice the Rayleigh range according to the present invention. The present inventors have obtained the above condition on the distance in consideration of the aforementioned relationships (1) and (2) for realizing soliton mode-locked continuous pulse generation. When the beam radius of the oscillating light in the solid-state laser medium is too large, the oscillation threshold and the CW mode-locking threshold value become too high. In such a case, laser oscillation does not occur, or mode locking does not occur, so that pulse oscillation becomes impossible. However, it is possible to achieve soliton mode locking in the case where the solid-state laser medium is arranged at a distance equal to or smaller than twice the Rayleigh range from the beam waist of the oscillating light.

In the case where the solid-state laser medium 15 is arranged at a distance approximately equal to twice the Rayleigh range from the SESAM 16, the beam radius $\omega_L$ of the oscillating light in the solid-state laser medium 15 becomes as large as 2.2 times the beam radius at the beam waist. Therefore, on the basis of the relationship (1), the laser oscillation threshold in this case is estimated at 4.8 times the laser oscillation threshold in the case where the beam waist exists in the solid-state laser medium 15. However, when the beam radius $\omega$ at the beam waist is approximately 25 micrometers, the beam radius $\omega_L$ of the oscillating light in the solid-state laser medium 15 is 2.2×25 micrometers, so that the laser oscillation threshold can be 100 mW or smaller. In this case, the Rayleigh range is 1.9 mm, and twice the Rayleigh range is 3.8 mm. Even in the case where the laser oscillation threshold is 100 mW, oscillation with sufficiently high efficiency is possible.

On the other hand, on the basis of the relationship (2), the CW mode-locking threshold in the case where the solid-state laser medium 15 is arranged at a distance approximately equal to twice the Rayleigh range from the SESAM 16 is estimated at 5.93 nJ, while the CW mode-locking threshold in the case where the beam waist exists in the solid-state laser medium 15 is estimated at 2.36 nJ. That is, the CW mode-locking threshold in the former case is approximately 2.5 times the CW mode-locking threshold in the latter case. (In the above estimation of the values of the CW mode-locking threshold, it is assumed that the depth $\Delta R$ of the absorbing modulation in the SESAM 16 is 0.9%, and the saturation fluence $F_{sat,A}$ in the SESAM 16 is 90 µJ/cm².) However, even when the CW mode-locking threshold is increased as above, it is possible to secure sufficient power of the oscillation output and achieve CW mode locking without a problem as long as the laser oscillation threshold is suppressed to 100 mW or below.

As explained above, when the solid-state laser medium 15 is arranged at a distance equal to or smaller than twice the Rayleigh range from the SESAM 16, it is possible to satisfy the relationships (1) and (2) and achieve downsizing of the mode-locked solid-state laser apparatus. In other words, a small-sized solid-state laser apparatus which can generate mode-locked soliton pulses can be configured by arranging the solid-state laser medium 15 at a distance equal to or smaller than twice the Rayleigh range from the SESAM 16.

3. Suppression of Competing Pulses and Background

Nevertheless, as mentioned before, in the case where the solid-state laser medium is arranged in close vicinity to an reflection mirror such as the SESAM, spatial hole burning occurs, so that processes which compete with the process for generation of the mode-locked soliton pulses can occur.

Therefore, even when the mode-locked soliton pulses are generated, the mode-locked soliton pulses are disturbed by the pulses competing with the mode-locked soliton pulses.

The present inventors have found that when the mode-locked solid-state laser apparatus is configured so that the depth $\Delta R$ of the absorbing modulation and the total intracavity dispersion D are respectively within predetermined ranges, the competing pulses generated by spatial hole burning can be suppressed, and stable generation of soliton pulses can be achieved.

The present inventors have investigated the dependence of the gain advantages $\Delta G$, on the spectral bandwidth (wavelength bandwidth) $\Delta\lambda_P$, of pulses and a background competing with mode-locked soliton pulses in a mode-locked solid-state laser apparatus having the configuration illustrated in FIG. 1. As mentioned before, the pulses and the background competing with mode-locked soliton pulses are considered to be generated by spatial hole burning. The gain advantages $\Delta G$ have been obtained by numerical calculation using the formulas indicated in the Paschotta reference.

Figure 3:
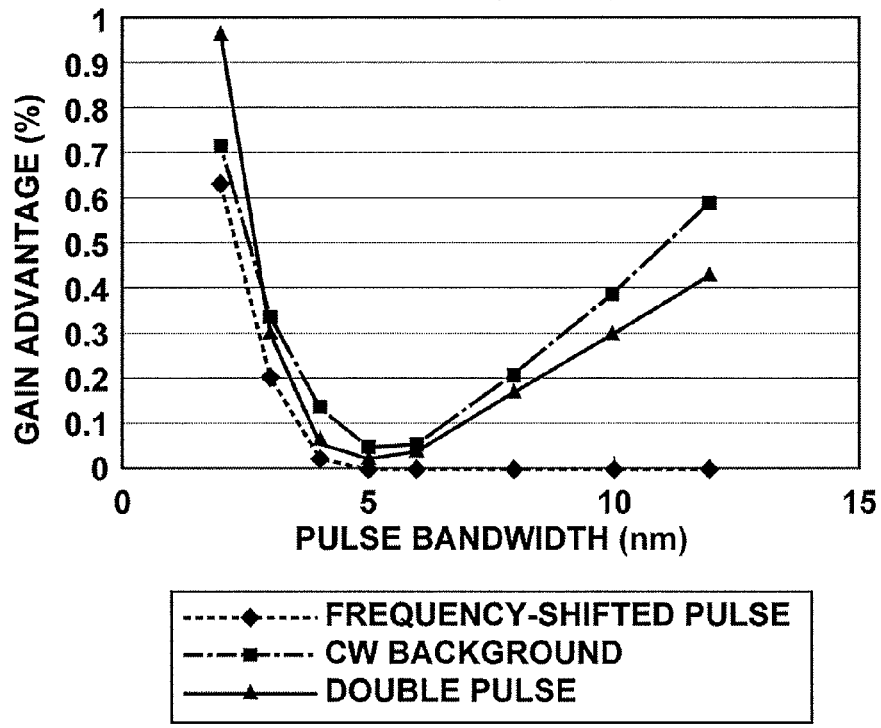
FIG. 3 is a graph indicating examples of relationships between the pulse bandwidth and the gain advantages of pulses and a background competing with mode-locked soliton pulses in a mode-locked solid-state laser apparatus in which the solid-state laser medium is Yb:KYW and the gain G of the soliton pulses is 0.04.

FIG. 3 is a graph indicating examples of the dependences of the gain advantages $\Delta G$, on the spectral bandwidth (wavelength bandwidth) $\Delta\lambda_P$, of pulses and a background competing with mode-locked soliton pulses in a mode-locked solid-state laser apparatus having the configuration illustrated in FIG. 1. In the numerical calculation for obtaining the dependences of FIG. 3, the solid-state laser medium is assumed to be a Yb:KYW crystal, and the gain G of the mode-locked soliton pulses is assumed to be 0.04. (Although the gain G of the mode-locked soliton pulses depends on the power and the spot diameter of the excitation light and details of the configuration of the mode-locked solid-state laser apparatus, the value "0.04" of the gain G of the mode-locked soliton pulses is chosen as a typical value of the gain in a mode-locked solid-state laser apparatus having a practical configuration.)

The gain advantage $\Delta G$ is the difference of the gain of pulses generated by each process competing with the process of generating the mode-locked soliton pulses from the gain of the mode-locked soliton pulses. FIG. 3 shows that the gain of the pulses and the background generated by each process competing with the process of generating the mode-locked soliton pulses is slightly greater than the gain of the mode-locked soliton pulses at any value of the pulse bandwidth. Therefore, in order to realize CW mode locking with the desired fundamental soliton pulses, it is necessary to suppress the above pulses and the background competing with the desired fundamental soliton pulses.

The SESAM 16 exhibits a nonlinear reflection characteristic according to the pulse energy $E_P$. (For example, see the Hönninger reference.) The nonlinear reflection characteristic of the SESAM 16 is effective in suppressing the CW background and the double pulses. Specifically, the CW background can be suppressed when the gain advantage $\Delta G(CW)$ of the CW background is equal to or smaller than half of the depth $\Delta R$ of the absorbing modulation (i.e., $\Delta G(CW) \leq \Delta R/2$), and the double pulses can be suppressed when the gain advantage $\Delta G(DP)$ of the double pulses is equal to or smaller than the value $\Delta R/S$ (i.e., $\Delta G(DP) \leq \Delta R/S$), where S is the saturation parameter at the SESAM, which is defined as $S = E_P/(F_{sat,A} \cdot A_{eff,A})$. Thus, both of the CW background and the double pulses can be suppressed when the pulse bandwidth is such that $\Delta G(CW) \leq \Delta R/2$ and $\Delta G(DP) \leq \Delta R/S$.

Figure 2:
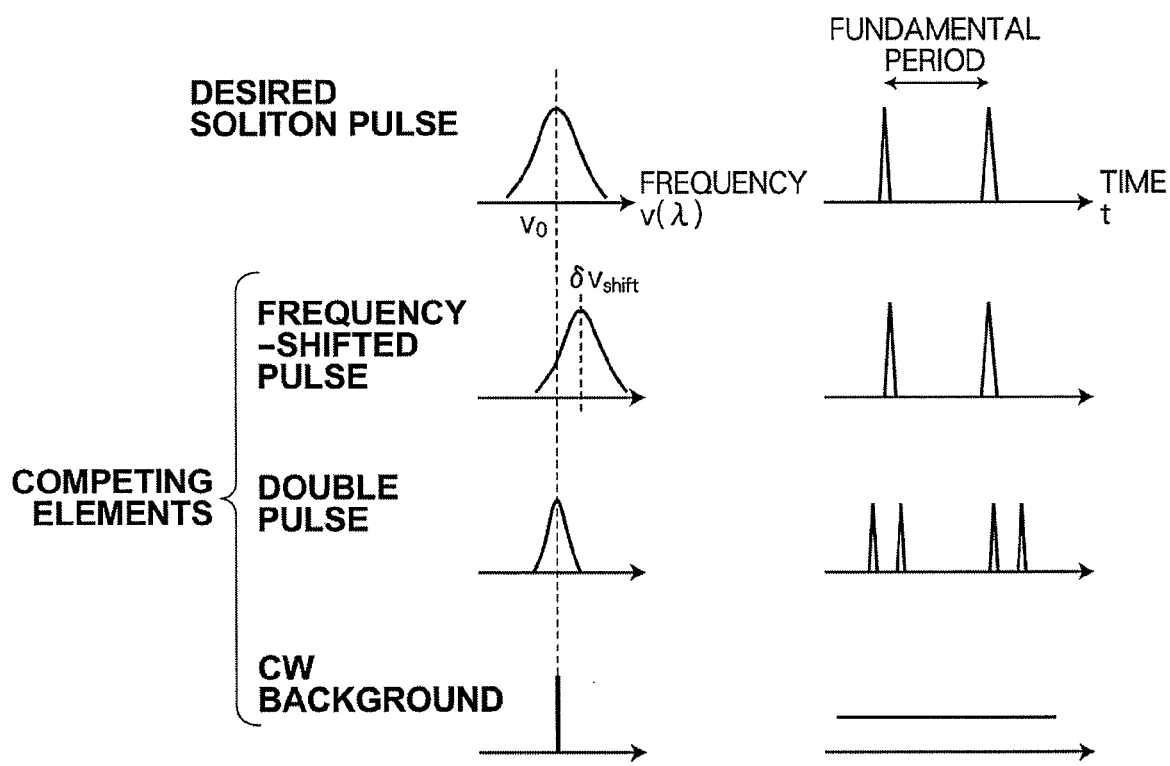
FIG. 2 illustrates examples of spectra (in the frequency domain), shapes, and timings of the desired soliton pulses and competing pulses and a background.

On the other hand, the SESAM 16 cannot suppress the frequency-shifted pulses. As mentioned before, the frequency-shifted pulses are equivalent to the mode-locked soliton pulses (repeated with the fundamental repetition period) in the pulse width, the pulse bandwidth, and the pulse energy, and are different from the mode-locked soliton pulses only in that the frequency is shifted from the mode-locked soliton pulses (as indicated in table 1 and FIG. 2). Therefore, the SESAM 16 exhibits an identical saturation parameter S for either of the frequency-shifted pulses and the mode-locked soliton pulses, so that the SESAM 16 cannot discriminate between the frequency-shifted pulses and the mode-locked soliton pulses.

Consequently, the mode-locked soliton pulses are stably generated when the pulse bandwidth is such that the gain advantage $\Delta G(SP)$ of the frequency-shifted pulses is approximately zero, and $\Delta G(CW) \leq \Delta R/2$ and $\Delta G(DP) \leq \Delta R/S$. Since the frequency-shifted pulses cannot be suppressed by the SESAM, in many cases, the lower limit of the range of the values of the pulse bandwidth which realizes stable generation of the mode-locked soliton pulses is restricted by the frequency-shifted pulses.

In addition, the pulse width $\tau_P$ is proportional to the absolute value $|D|$ of the total intracavity dispersion D as expressed by the equation (4).

$$\tau_P = \frac{1.76|D|\lambda_0 A_{eff,L}}{4\pi n_2 l_S} \frac{1}{E_P}, \quad (4)$$

(See the Hönninger reference.) Further, the pulse width $\tau_P$ is inversely proportional to the pulse bandwidth.

In consideration of the above relationships, the present inventors have found that since the range of the values of the pulse bandwidth which allow stable generation of the mode-locked soliton pulses is restricted, the total intracavity dispersion D is also restricted. Then, the present inventors have further found it necessary to set the total intracavity dispersion D to a value within an appropriate range according to the depth $\Delta R$ of the absorbing modulation, for suppressing the spatial hole burning and stably generating mode-locked soliton pulses.

Figure 4:
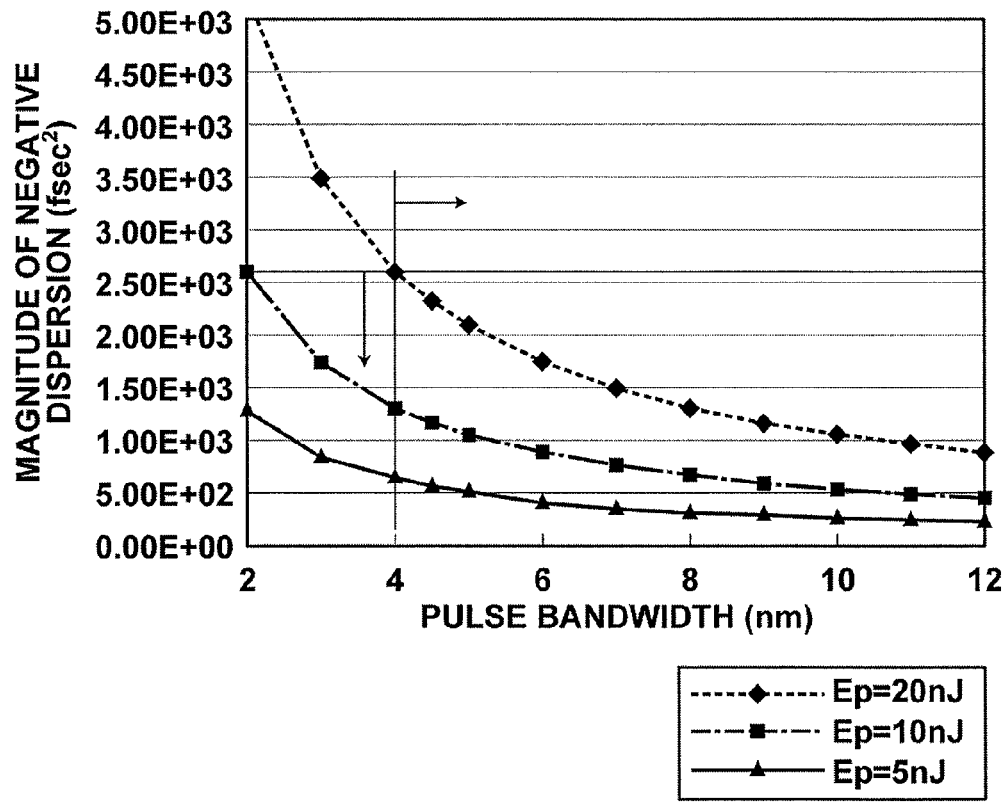
FIG. 4 is a graph indicating examples of relationships between the pulse bandwidth and the necessary magnitude of dispersion in a mode-locked solid-state laser apparatus.

FIG. 4 is a graph indicating examples of the dependences of (the absolute values $|D|$ of) the total intracavity dispersions D on the pulse bandwidth, which are obtained on the basis of the equation (4). (The pulse width $\tau_P$ is inversely proportional to the pulse bandwidth.)

In consideration of the above dependences of the gain advantages $\Delta G$ and the total intracavity dispersion D on the pulse bandwidth, the present inventors have found that when the depth $\Delta R$ of the absorbing modulation and the saturation parameter S at the saturable absorbing mirror satisfies the relationships, $$\Delta G(CW) \leq \Delta R/2 \text{ and } \Delta G(DP) \leq \Delta R/S, \text{ and} \quad (A)$$

the mode-locked solid-state laser apparatus is configured so as to make the total intracavity dispersion D (i.e., the dispersion D caused in light having a predetermined wavelength during a round trip of the light in the resonator) smaller than zero and make the absolute value $|D|$ of the total intracavity dispersion D fall within a range in which the relationship expressed by the inequalities (A) are satisfied and the gain advantage $\Delta G(SP)$ is approximately zero, mode-locked soliton pulses can be stably generated, where $\Delta G(CW)$ is the gain advantage of the CW background over the mode-locked soliton pulses, $\Delta G(DP)$ is the gain advantage of the double pulses over the mode-locked soliton pulses, and $\Delta G(SP)$ is the gain advantage of the frequency-shifted pulses over the mode-locked soliton pulses.

Hereinbelow, the performance of the mode-locked solid-state laser apparatus according to the present invention is discussed below for cases where the above-mentioned parameters have various values.

Conventionally, the mode-locked solid-state laser apparatuses have been designed so that the saturation parameter S at the SESAM is in the range from approximately three to five. Therefore, concrete examples of the mode-locked solid-state laser apparatus according to the present invention explained below are assumed to be used in the same range of the saturation parameter S. Specifically, in the following explanations, the saturation parameter S at the SESAM is assumed to be four.

Referring to FIG. 3, the minimum gain advantage $\Delta G(DP)$ of the double pulses is 0.05%. Therefore, $\Delta G \cdot S = 0.2\%$. In order to suppress the double pulses when the saturation parameter S at the SESAM is 4, the depth $\Delta R$ of the absorbing modulation is required to be equal to or greater than $\Delta G \cdot S = 0.2\%$, i.e., $\Delta Rmin \geq \Delta G \cdot S = 0.2\%$.

The depths $\Delta R$ of the absorbing modulation at the commercially available SESAMs are at least approximately 0.3%. In the system in which spatial hole burning does not occur, the depth $\Delta R$ of approximately 0.3% to 2% is normally considered to be appropriate for mode locking.

When $\Delta R = 0.3\%$ and $S = 4$, in order to suppress the CW background, the pulse bandwidth is limited by the condition $\Delta G(CW) \leq \Delta R/2 = 0.15\%$. Therefore, FIG. 3 shows that the CW background can be suppressed only when the pulse bandwidth is 4 to 7 nm. In addition, in order to suppress the double pulses, the pulse bandwidth is also limited by the condition $\Delta G(DP) \leq \Delta R/S = 0.075\%$. Therefore, FIG. 3 shows that the double pulses can be suppressed only when the pulse bandwidth is 4.5 to 6.0 nm. Further, FIG. 3 shows that the frequency-shifted pulses can be suppressed only when the pulse bandwidth is 4 nm or greater. Consequently, all of the CW background, the double pulses, and the frequency-shifted pulses can be suppressed only when the pulse bandwidth is 4.5 to 6.0 nm, which is substantially determined by the condition for suppressing the double pulses. Thus, (at the wavelength $\lambda_0$ of 1045 nm) the minimum allowable pulse width (i.e., the duration of the Fourier transform limited pulse) is 254 to 191 femtoseconds (i.e., 223 fsec±14%). That is, the allowable range of the values of the pulse width is extremely limited.

However, in order to secure an allowable range of the values of the pulse bandwidth with some margin, at least twice the minimum depth $\Delta Rmin$ (=0.2%) of the absorbing modulation mentioned before is necessary. That is, the depth $\Delta R$ of the absorbing modulation at the SESAM required for widening the allowable range of values of the pulse bandwidth is 0.4% or greater. The depths $\Delta R$ of absorbing modulation in the practicable SESAMs are 0.4% or greater.

For example, when $\Delta R = 0.8\%$ and $S = 4$, the pulse bandwidth $\Delta \lambda_P$ can be 4 to 8 nm corresponding to the pulse width $\tau_P = 287$ to 143 fsec. Further, when $\Delta R = 1.4\%$ and $S = 4$, the pulse bandwidth $\Delta \lambda_P$ can be increased to 4 to 11 nm corresponding to the pulse width $\tau_P = 287$ to 104 fsec.

Nevertheless, as explained above, even in the case where the depth $\Delta R$ of the absorbing modulation at the SESAM is 0.4% or greater, the range of values of the pulse bandwidth in which the double pulses and the CW background can be suppressed is limited, so that the range of values of the pulse width is also limited.

Incidentally, in the case where a mode-locked solid-state laser apparatus has a 3-watt class semiconductor laser having the emitter width of 100 micrometers as the excitation light source, the resonator length of 50 mm, the transmission efficiency of 85%, the absorption efficiency of 90%, the optical conversion efficiency of 30%, and the output mirror's transmittance $T_{OC}$ of 1%, the internal energy $E_P$ is approximately 23 nJ. This is the maximum pulse energy which the concrete examples of the mode-locked solid-state laser apparatus according to the present invention are supposed to have. (Theoretically, the small-sized mode-locked solid-state laser apparatuses to which the present invention is applied and which has a configuration as illustrated in FIG. 1 cannot have pulse energy exceeding the above value.)

According to the equation (4), the total intracavity dispersions D of $-950 \text{ fsec}^2$ is necessary for generation of the pulses having a pulse width of 104 fsec (corresponding to the pulse bandwidth of 11 nm), and the total intracavity dispersions D of approximately $-2500 \text{ fsec}^2$ is necessary for generation of the pulses corresponding to the pulse bandwidth of 4 nm. The pulse bandwidth of 4 nm is the lower limit of the range of values of the pulse bandwidth which allow stable generation of mode-locked soliton pulses, and is determined by the frequency-shifted pulses. In addition, the required total intracavity dispersion D is also a function of the pulse energy $E_P$, and the magnitude of the required total intracavity dispersion D increases with increase in the pulse energy $E_P$. Therefore, the above value of approximately $-2500 \text{ fsec}^2$ is the upper limit of the absolute value of the required total intracavity dispersion D which is supposed to be realized in the mode-locked solid-state laser apparatus according to the present invention. The magnitude of the required total intracavity dispersion D decreases with decrease in the pulse energy $E_P$, and the lower limit of the absolute value of the required total intracavity dispersion D is zero according to the equation (4).

For example, in the case where the mode-locked solid-state laser apparatus illustrated in FIG. 1 uses Yb:KYW as the solid-state laser medium, and the depth $\Delta R$ of the absorbing modulation is equal to or greater than 0.4%, the total intracavity dispersion D is generally required to be in the range of $-2500 \text{ fsec}^2$ to $0 \text{ fsec}^2$. However, in practice, the range of the total intracavity dispersion D is further limited according to the configuration of the mode-locked solid-state laser apparatus. For example, the total intracavity dispersion D is required to be in the range of $-2500 \text{ fsec}^2$ to $-1400 \text{ fsec}^2$ when $\Delta R = 0.8\%$, $S = 4$, and $E_P = 20$ nJ in the above mode-locked solid-state laser apparatus having the Yb:KYW laser medium, and the total intracavity dispersion D is required to be in the range of $-2500 \text{ fsec}^2$ to $-1000 \text{ fsec}^2$ when $\Delta R = 1.4\%$, $S = 4$, and $E_P = 20$ nJ in the above mode-locked solid-state laser apparatus having the Yb:KYW laser medium.

Further, when the mode-locked solid-state laser apparatus according to the present invention is actually assembled, it is necessary to take into account the fact that the operation of the mode-locked solid-state laser apparatus is likely to become unstable near an extremity of the range in which mode-locked soliton pulses can be stably generated. Therefore, it is preferable to configure the mode-locked solid-state laser apparatus to realize the total intracavity dispersion D with a margin of approximately 20%. For example, when the above mode-locked solid-state laser apparatus having the Yb:KYW laser medium with $\Delta R = 0.8\%$, $S = 4$, and $E_P = 20$ nJ is configured to realize the total intracavity dispersion D in the range of $-2000 \text{ fsec}^2$ to $-1700 \text{ fsec}^2$, the stability of the CW mode-locked operation of the mode-locked solid-state laser apparatus can be increased.

Figure 5:
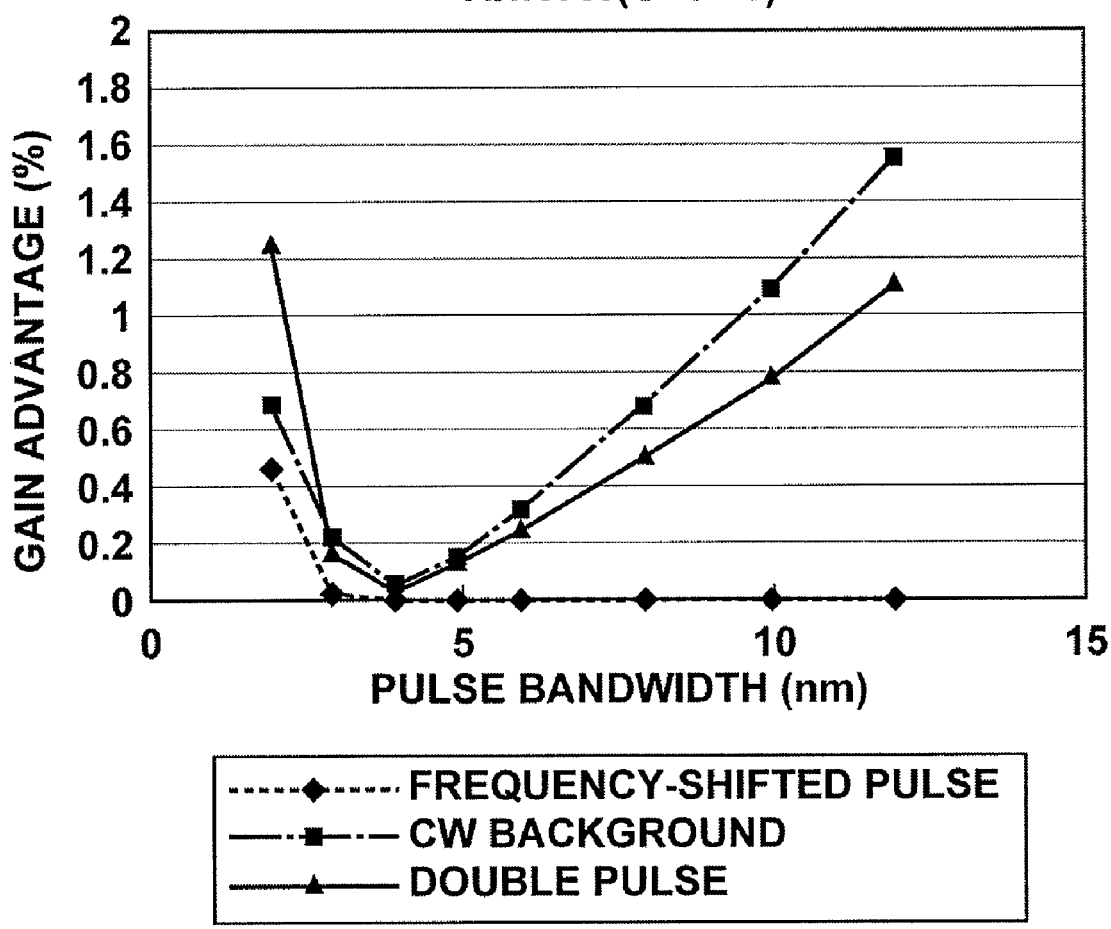
FIG. 5 is a graph indicating examples of relationships between the pulse bandwidth and the gain advantages of pulses and a background competing with mode-locked soliton pulses in a mode-locked solid-state laser apparatus in which the solid-state laser medium is Yb:KYW and the gain G of the mode-locked soliton pulses is 0.10.

FIG. 5 is a graph indicating examples of the dependences of the gain advantages $\Delta G$, on the spectral bandwidth (wavelength bandwidth) $\Delta \lambda_P$, of pulses and a background competing with mode-locked soliton pulses in a mode-locked solid-state laser apparatus having the configuration illustrated in FIG. 1. The gain advantages ΔG of FIG. 5 have also been obtained by numerical calculation in a similar manner to FIG. 3. In the numerical calculation for obtaining the dependences of FIG. 5, the solid-state laser medium is assumed to be a Yb:KYW crystal, and the gain G of the mode-locked soliton pulses is assumed to be 0.1. As mentioned before, the pulses and the background competing with mode-locked soliton pulses are considered to be generated by spatial hole burning.

The comparison between the graphs of FIGS. 3 and 5 shows that the increase in the gain (or increase in the excitation power) increases the gain advantages ΔG of the pulses and the CW background competing with mode-locked soliton pulses, and shifts the pulse bandwidths at which the gain advantages ΔG of the CW background and the double pulses are minimized, toward the direction of decreasing the pulse bandwidth. In addition, the comparison between the graphs of FIGS. 3 and 5 also shows that the increase in the gain from G=0.04 to G=0.1 greatly reduces the range of values of the pulse bandwidth in which the pulses and the CW background competing with mode-locked soliton pulses are suppressed, and makes the mode locking with a small pulse width difficult.

4. Negative-Dispersion Mirror

Next, the negative-dispersion mirror 5 used in the mode-locked solid-state laser apparatus of FIG. 1 is explained below.

Figure 6:
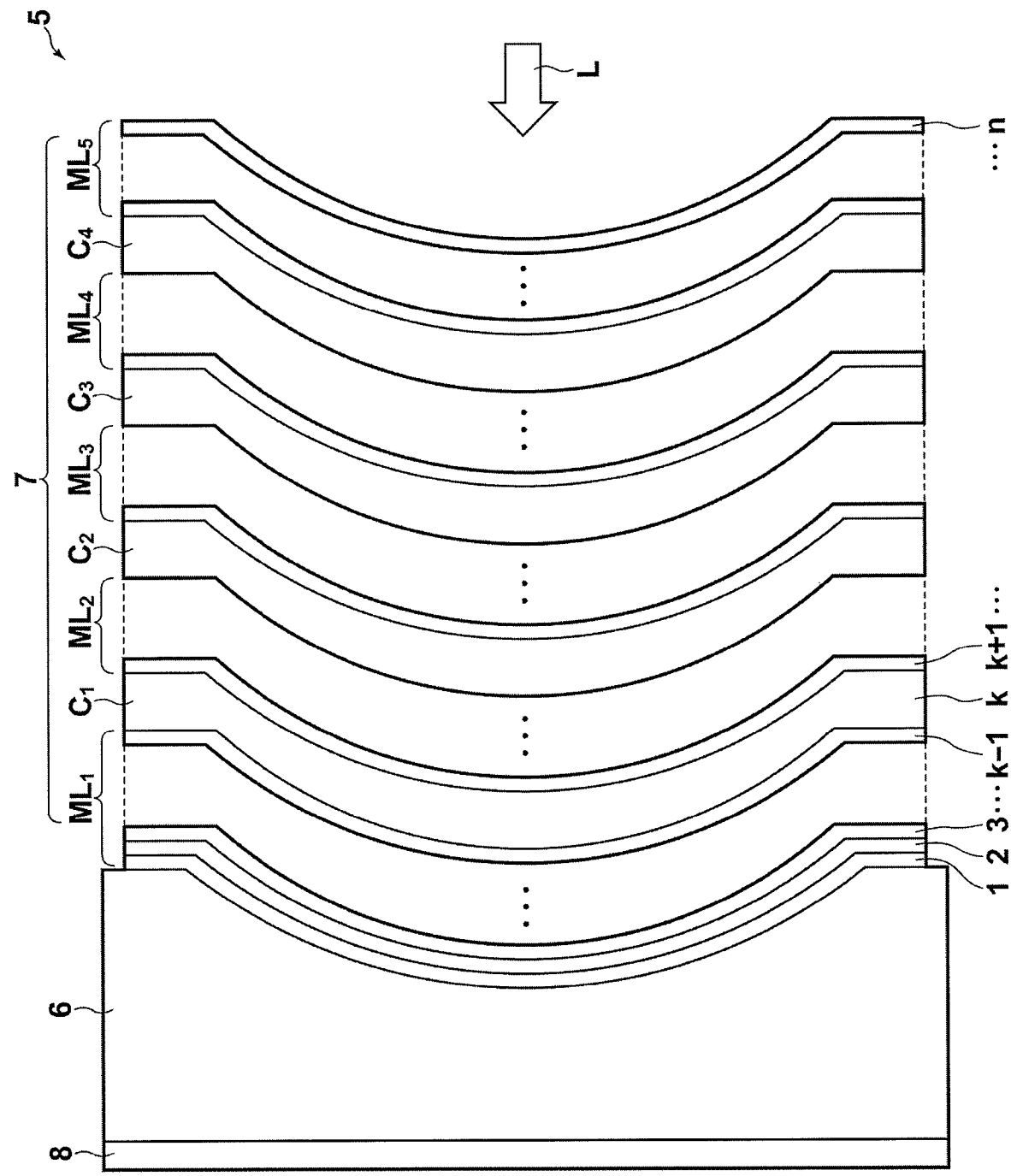
FIG. 6 is a schematic cross-sectional view of a negative-dispersion mirror which can also be used as an output mirror.

FIG. 6 is a schematic cross-sectional view of an example of the negative-dispersion mirror 5. The negative-dispersion mirror 5 is constituted by a glass substrate 6, a dielectric multilayer structure 7, and an antireflection film 8. The glass substrate 6 has a concave surface on one side, and the dielectric multilayer structure 7 is formed on the concave surface of the glass substrate 6. The antireflection film 8 is formed on another surface of the glass substrate 6 opposite to the concave surface.

The dielectric multilayer structure 7 is constituted by three or more multilayer mirrors $ML_1, ML_2, \ldots ML_{m+1}$ and cavity layers $C_1, C_2, \ldots C_m$, where m is an integer greater than one. The cavity layers $C_1, C_2, \ldots C_m$ are arranged at predetermined intervals across the entire thickness of the dielectric multilayer structure 7 so that each of the cavity layers $C_1, C_2, \ldots C_m$ is sandwiched between two of the three or more multilayer mirrors $ML_1, ML_2, \ldots ML_{m+1}$ and causes resonance of the light L having the predetermined wavelength between the two of the three or more multilayer mirrors $ML_1, ML_2, \ldots ML_{m+1}$. The antireflection film 8 is arranged for preventing reflection of the light which passes through the dielectric multilayer structure 7, at the surface of the glass substrate 6 opposite to the concave surface. Thus, 97% to 99.5% of the light L which enters the negative-dispersion mirror 5 from the side of the dielectric multilayer structure 7 is reflected by the dielectric multilayer structure 7 (i.e., the reflectance of the light L by the dielectric multilayer structure 7 is 97% to 99.5%), and 3% to 0.5% of the light L passes through the dielectric multilayer structure 7, the glass substrate 6, and the antireflection film 8.

The layers constituting the dielectric multilayer structure 7 are formed on the concave surface of the glass substrate 6 in the order as indicated in FIG. 6, where the first layer, the second layer, ..., the (k−1)-th layer, the k-th layer, the (k+1)-th layer, ..., the n-th layer are formed in this order from the substrate side to the outermost side so that the multilayer mirrors $ML_1, ML_2, \ldots ML_{m+1}$ and the cavity layers $C_1, C_2, \ldots C_m$ are alternately laminated, where n and k are integers satisfying 1<k<n. For example, the multilayer mirror $ML_1$ is realized by the first to (k−1)-th layers on the substrate side, the cavity layer $C_1$ is realized by the k-th layer, and the multilayer mirror $ML_{m+1}$ is realized by the k'-th to n-th layers on the outermost side, where k is an integer satisfying 1<k<k'<n.

Although m=4 in the example illustrated in FIG. 6, m=2 in the minimal structure, which includes three multilayer mirrors and two cavity layers. However, there is no upper limit on the value m. The value m may be increased or decreased as needed.

The locations of the cavity layers $C_1, C_2, \ldots C_m$ along the thickness direction are not concentrated in part of the entire thickness of the dielectric multilayer structure 7, and the cavity layers $C_1, C_2, \ldots C_m$ are substantially uniformly distributed across the entire thickness of the dielectric multilayer structure 7. In the case where the dielectric multilayer structure includes three or more cavity layers $C_1, C_2, \ldots C_m$, the three or more cavity layers be approximately equally spaced so that the variations in the intervals between the three or more cavity layers are within ±35% of the average of the intervals between the three or more cavity layers $C_1, C_2, \ldots C_m$.

The negative-dispersion mirror 5 imparts a mirror dispersion of $-3000$ $fsec^2$ to $-600$ $fsec^2$ to the light L (the oscillating light 18) having the aforementioned wavelength, and the reflectance of the light L by the dielectric multilayer structure 7 is 97% to 99.5%. Further, when the light L has a bandwidth of 10 nm containing the above predetermined wavelength, the negative-dispersion mirror 5 imparts to the light a mirror dispersion of $-3000$ $fsec^2$ to $-600$ $fsec^2$, and the reflectance of the light by the dielectric multilayer structure 7 is 97% to 99.5%. In the negative-dispersion mirror 5, the values of the mirror dispersion and the reflectance can be arbitrarily set in the above ranges, respectively.

It is preferable that each of the three or more multilayer mirrors $ML_1, ML_2, \ldots ML_{m+1}$ in the negative-dispersion mirror 5 be constituted by high-index layers having a high refractive index $n_{m1}$ and low-index layers having a low refractive index $n_{m2}$ ($<n_{m1}$) which are alternately laminated, and the total number of the high-index layers and the low-index layers in each of the three or more multilayer mirrors $ML_1, ML_2, \ldots ML_{m+1}$ be five or greater. For example, the odd-numbered layers (including the first layer, the third layer, ...) are high-index layers, and the even-numbered layers (including the second layer, the fourth layer, ...) are low-index layers.

The high-index layers in the negative-dispersion mirror 5 may be formed of one of a sulfide of Zn and oxides of Ti, Zr, Hf, Nb, Al, Zn, Y, Sc, La, Ce, Pr, and Ta, or a compound or mixture containing one or a combination of a sulfide of Zn and oxides of Ti, Zr, Hf, Nb, Al, Zn, Y, Sc, La, Ce, Pr, and Ta. Specifically, the high-index layers may be formed of $TiO_2$, $Ta_2O_5$, $ZrO_2$, Substance H4, or the like, where Substance H4 (a product of Merck KGaA, Germany) is an evaporation material mainly containing $LaTi_xO_y$.

In addition, the low-index layers in the negative-dispersion mirror 5 may be formed of one of an oxide of Si and fluorides of Ca, Li, Mg, Na, Th, Al, Hf, La, Y, and Zr, or a compound or mixture containing one or a combination of an oxide of Si and fluorides of Ca, Li, Mg, Na, Th, Al, Hf, La, Y, and Zr. Specifically, the low-index layers may be formed of $SiO_2$, MgF, $Al_2O_3$, and the like.

However, the constituent materials of the high-index layers and the low-index layers are not limited to the above materials. The high-index layers and the low-index layers may be formed of any other materials as long as the refractive indexes of the high-index layers are higher than the refractive indexes of the lower-index layers.

The refractive indexes of the cavity layers are not specifically limited. For example, the cavity layers may be formed of one of the materials of which the high-index layers and the low-index layers are formed. In this case, it is possible to prevent increase in the cost and the number of process steps.

The optical thicknesses of the cavity layers are generally greater than the other layers. In the present embodiment, the optical thicknesses of the cavity layers are equal to or greater than twice the quarter wavelength $\lambda/4$ (i.e., half of the predetermined wavelength $\lambda$ of the aforementioned light L), and are preferably four to eight times the quarter wavelength $\lambda/4$. The optical thickness of each of layers constituting the three or more multilayer mirrors $ML_1$ and $ML_2$ in the negative-dispersion mirror 5 is equal to or greater than half of the quarter wavelength $\lambda/4$ and smaller than twice the quarter wavelength $\lambda/4$ (i.e., equal to or greater than one-eighth of the predetermined wavelength $\lambda$ and smaller than half of the predetermined wavelength $\lambda$). The optical thickness of a film is defined as the product of refractive index n of the film and the film thickness d.

5. Other Features of Apparatus

The light L having the predetermined wavelength is the oscillating light 18, which is emitted from the solid-state laser medium 15 and is oscillating in the resonator. Therefore, the light L is determined according to the configuration of the mode-locked solid-state laser apparatus in which the negative-dispersion mirror 5 is used. For example, the wavelength $\lambda$ of the light L is 1045 nm in the case where the solid-state laser medium is Yb:KYW (KY (WO$_4$)$_2$), 1040 nm in the case where the solid-state laser medium is Yb:KGW (KGd (WO$_4$)$_2$), 1050 nm in the case where the solid-state laser medium is Yb:YAG, and 1076 nm in the case where the solid-state laser medium is Yb:Y$_2$O$_3$ As mentioned before, the excitation light 10 is injected into the resonator along a direction nonparallel to the optical axis of the resonator, and is then reflected by the dichroic mirror 13 so as to be injected into the solid-state laser medium 15. The dichroic mirror 13 is arranged on the optical axis of the resonator, and highly reflects the excitation light. (For example, the dichroic mirror 13 reflects the excitation light with a reflectance higher than 85%). The dichroic mirror 13 substantially transmits the oscillating light. (For example, the dichroic mirror 13 reflects the oscillating light with a reflectance lower than 0.5%). Therefore, the lowering of the laser oscillation efficiency due to the insertion of the dichroic mirror 13 can be minimized, and the excitation light source can be arranged close to the solid-state laser medium, compared with the case where the conventional optical system is used. It is preferable to arrange the excitation optical system 12 and the dichroic mirror 13 so that the excitation light is incident on the dichroic mirror 13 at an incident angle equal to 45 degrees or the Brewster's angle. In addition, the dichroic mirror 13 should be coated according to the incident angle of the excitation light.

Figure 25:
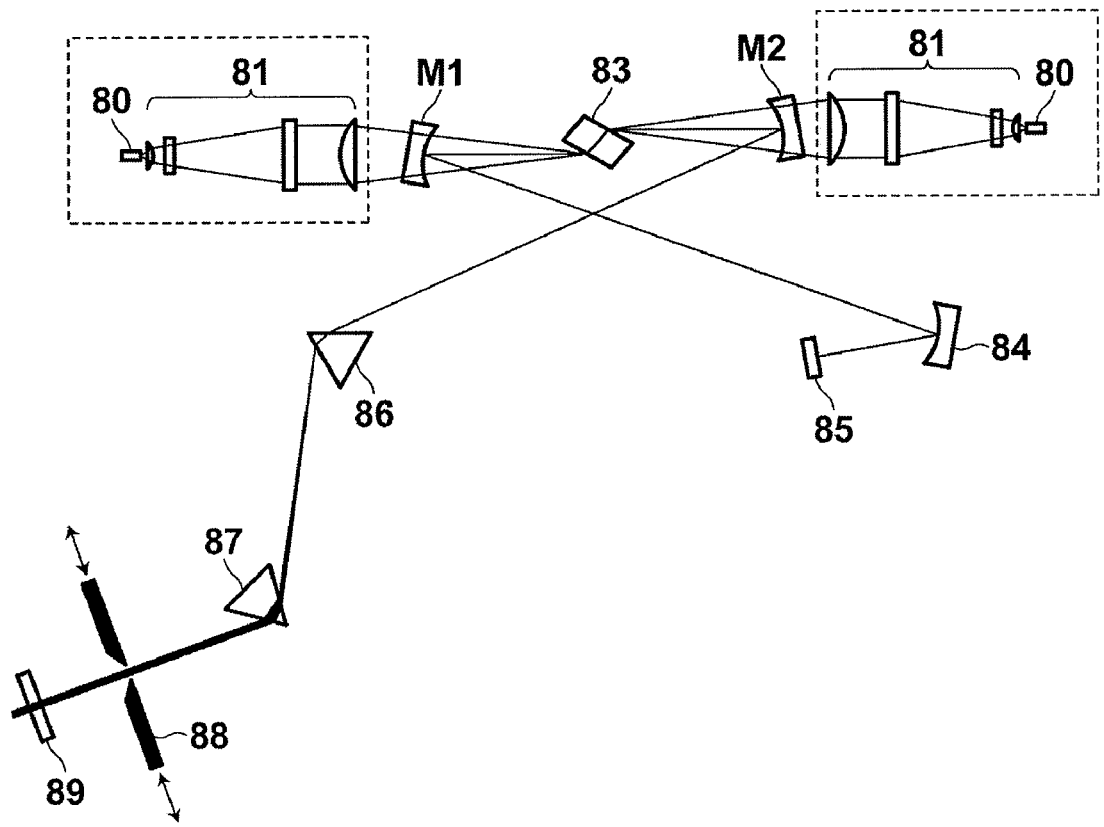
FIG. 25 is a schematic plan view illustrating a conventional mode-locked solid-state laser apparatus.
Figure 26:
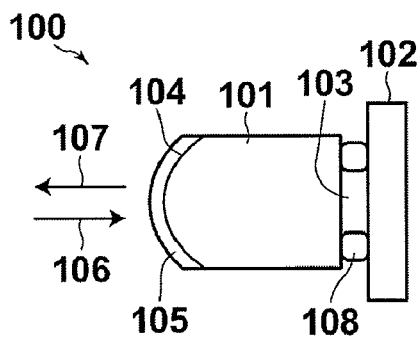
FIG. 26 is a schematic plan view illustrating a conventional mode-locked solid-state laser apparatus.
Figure 27:
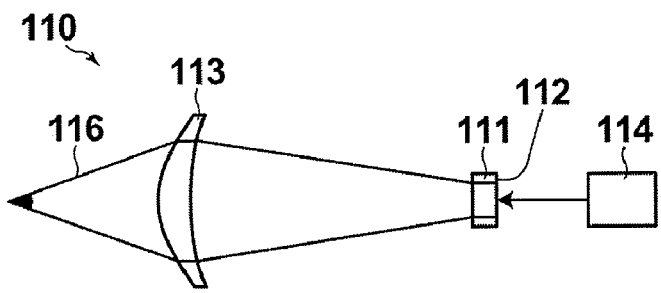
FIG. 27 is a schematic plan view illustrating a conventional mode-locked solid-state laser apparatus.

Further, since the dichroic mirror 13 is arranged in the resonator as above, the excitation optical system 12 can be realized by a single lens such as a graded-index lens (GRIN lens) in order to reduce the distance between the solid-state laser medium and the lens in the excitation optical system 12. For example, in the case where a GRIN lens having a pitch of 0.23, an effective focal length of 1.94 mm, a lens length of 4.42 mm, and a lens diameter of 1.8 mm (available from Thorlabs Japan Inc.) is used for realizing a focusing system of 1:2 magnification as the excitation optical system 12, the distance from the excitation-light source to the solid-state laser medium is approximately 8.3 mm, which is the sum of the distance, $d1=\frac{2}{3}f=1.3$ mm, from the excitation-light source to the front-side principal point of the lens, the lens length of 4.4 mm, and the distance, $d2=2\times d1=2.6$ mm, from the rear-side principal point of the lens to the solid-state laser medium. That is, the distance from the excitation-light source to the solid-state laser medium is very small. On the other hand, in the case where the conventional optical system illustrated in FIG. 25 is used (i.e., the excitation light is injected through the concave output mirror) for realizing a focusing system of 1:2 magnification, the distance from the excitation-light source to the solid-state laser medium is at least 75 to 200 mm. Thus, according to the present invention, the dimension of the excitation optical system 12 can be remarkably reduced.

Although the stability of generation of the mode-locked soliton pulses is explained before for the exemplary case where the resonator length is 50 mm, it is possible to achieve the stability of both of the laser resonator and the mode locking as long as the length of the resonator does not exceed 200 mm, for the reason explained below.

When the length of the resonator is increased, the pulse repetition rate decreases, and the pulse energy increases, so that the CW mode-locking threshold can be more easily exceeded. Therefore, on the basis of the equation (2) as the condition for preventing the Q-switching operation during the soliton mode locking, it can be considered that greater pulse energy and longer resonator length are more preferable.

However, from the viewpoint that the mechanical variations cause instability of the laser output, there is a limit to the resonator length. The mechanical limit of the resonator length is obtained as approximately 200 mm from the following consideration.

In many solid-state laser apparatuses having a resonator length of approximately 1 m, optical misalignment caused by mechanical vibrations and drifts, thermal displacement of structural components, flexure, and the like deteriorates the laser characteristics and makes the laser operation unstable. The alignment tolerance of the resonator is known to be reversely proportional to the resonator length and a function of the mirror curvature. For example, the alignment tolerance of the one-meter class resonator is known to be approximately 50 to 100 μrad. (For example, see N. Hodgson and H. Weber, "Optical Resonators: Fundamentals, Advanced Concepts and Applications", Springer, pp. 214-223, 2007.) Therefore, when the resonator length is reduced to 200 mm or smaller, the alignment tolerance of the resonator can be five times increased to 250 to 500 μrad. Although the mechanical vibrations of the mirrors cannot be unconditionally quantified, a catalog of Newport Corporation reports that the mechanical vibrations of a mirror when a common gimbal mount is used is 50 μrad under temperature variations of 8 degrees centigrade. In such a case, the mechanical vibrations of a mirror is equivalent to the alignment tolerance of the one-meter class resonator, and is approximately one-fifth of the alignment tolerance of resonators having the length of 200 mm or smaller. That is, in the solid-state laser apparatuses having the resonator length of 200 mm or smaller, the mechanical vibrations of a mirror are considered to be ignorable.

Consequently, when the resonator length is 200 mm or smaller, it is possible to achieve the stability of both of the laser resonator and the mode locking. Therefore, it is preferable that the resonator length not exceed 200 mm.

6. Other Solid-State Laser Mediums

Although the stability of generation of the mode-locked soliton pulses is explained before for the exemplary case where the solid-state laser medium is Yb:KYW, calculation results similar to FIGS. 3 and 5 can also be obtained even in the case where the solid-state laser medium is a Yb:KGW crystal since the physical properties such as the fluorescent bandwidth, the induced-emission cross section, and the absorption cross section of the Yb:KYW and Yb:KGW are approximately identical except that the nonlinear refractive index $n_2$ (=20×10$^{-20}$ m$^2$/W) of Yb:KGW is approximately 2.3 times the nonlinear refractive index $n_2$ (=8.7×10$^{-20}$ m$^2$/W) of Yb:KYW. Therefore, the magnitude of the total intracavity dispersion D in the mode-locked solid-state laser apparatus in which Yb:KGW is used becomes approximately 2.3 times the magnitude of the total intracavity dispersion D in the mode-locked solid-state laser apparatus in which Yb:KYW is used. (The latter is indicated in FIG. 4.) That is, in the mode-locked solid-state laser apparatus in which Yb:KGW is used, it is preferable that the total intracavity dispersion D be equal to or greater than −5750 fsec$^2$ and smaller than 0 fsec$^2$.

Figure 7:
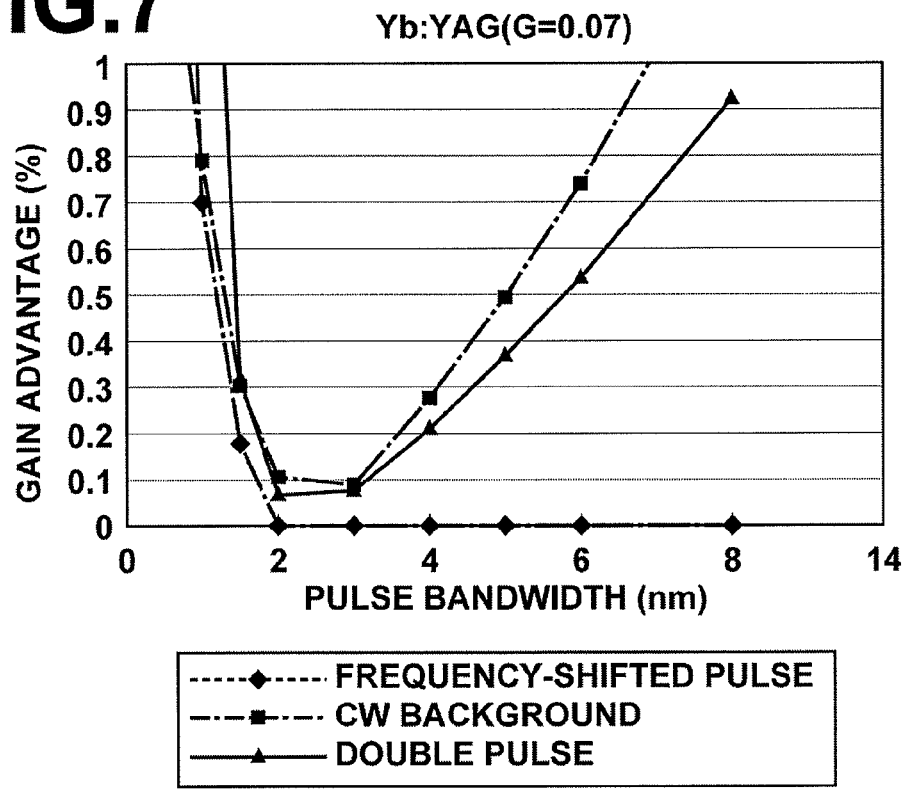
FIG. 7 is a graph indicating examples of relationships between the pulse bandwidth and the gain advantages of pulses and a background competing with mode-locked soliton pulses in a mode-locked solid-state laser apparatus in which the solid-state laser medium is Yb:YAG and the gain G of the mode-locked soliton pulses is 0.07.

FIG. 7 is a graph indicating examples of the dependences of the gain advantages ΔG, on the spectral bandwidth (wavelength bandwidth) $\Delta\lambda_P$, of pulses and a background competing with mode-locked soliton pulses in a mode-locked solid-state laser apparatus having the configuration illustrated in FIG. 1 in which the solid-state laser medium 15 is Yb:YAG and oscillation at the wavelength of 1050 nm occurs. The dependences of FIG. 7 are also obtained by numerical calculation in a similar manner to FIG. 3. In the numerical calculation for obtaining the dependences of FIG. 7, the gain G of the mode-locked soliton pulses is assumed to be 0.07.

On the basis of the dependences of the gain advantages ΔG indicated in FIG. 7, it is understood that a bandwidth which realizes stable generation of mode-locked soliton pulses can be obtained when the saturation parameter S is 4 and the depth ΔR of the absorbing modulation is equal to or greater than 0.4%. For example, in the case where ΔR=0.8%, the double pulses and the CW background can be suppressed when the bandwidth is 2 to 4 nm. In the case where the depth ΔR of the absorbing modulation is further increased, the mode-locked soliton pulses can be stably generated with a greater bandwidth. In practice, it is preferable to realize mode locking which generates soliton pulses with a short pulse width of approximately 300 fsec or smaller. Therefore, it is preferable that the pulse bandwidth be approximately 4 nm (corresponding to the pulse width of 287 fsec) or greater. Thus, in the case where the solid-state laser medium 15 is Yb:YAG, it is preferable that ΔR≧0.8%. Since the nonlinear refractive index $n_2$ (=6.2×10$^{-20}$ m$^2$/W) of Yb:YAG is approximately 70% of the nonlinear refractive index $n_2$ of Yb:KYW, the preferable range of the magnitude of the total intracavity dispersion D in the mode-locked solid-state laser apparatus in which Yb:YAG is used is approximately 70% of the preferable range of the magnitude of the total intracavity dispersion D in the mode-locked solid-state laser apparatus in which Yb:KYW is used. That is, the total intracavity dispersion D in the mode-locked solid-state laser apparatus in which Yb:YAG is used is preferably equal to or greater than −1750 fsec$^2$ and smaller than 0 fsec$^2$.

The solid-state laser mediums formed of ceramics are currently receiving attention, and can be used as the solid-state laser medium 15 in the mode-locked solid-state laser apparatus according to the present invention. Although the solid-state laser mediums are normally a crystal, some solid-state laser mediums of garnet-group materials (such as YAG) can be ceramic materials. While the ceramic materials exhibit optical characteristics equivalent or superior to the crystalline materials, the use of the ceramic materials enables formation of large-sized solid-state laser mediums and cost reduction. Besides the garnet-group materials, the so-called C-rare earth materials (such as Yb:Y$_2$O$_3$, Yb:Sc$_2$O$_3$, and Yb:Lu$_2$O$_3$) can also be formed into ceramics. (See A. Shirakawa et al., "Diode-pumped mode-locked Yb$^{3+}$:Y$_2$O$_3$ ceramic laser", Optics Express, Vol. 11, No. 22, pp. 2911-2916, 2003.) Further, some other materials (such as glass) which can inherently be formed into a large-sized body at low cost have already been used as solid-state laser mediums. For example, laser devices using Yb-doped glass or Er,Yb-codoped glass and emitting wideband light have been reported. (See G. J. Spühler et al., "Soliton mode-locked Er:Yb:glass laser", Optics Letters, Vol. 30, Issue 3, pp. 263-265, 2005.) The present invention can also be applied to such laser devices.

Figure 8:
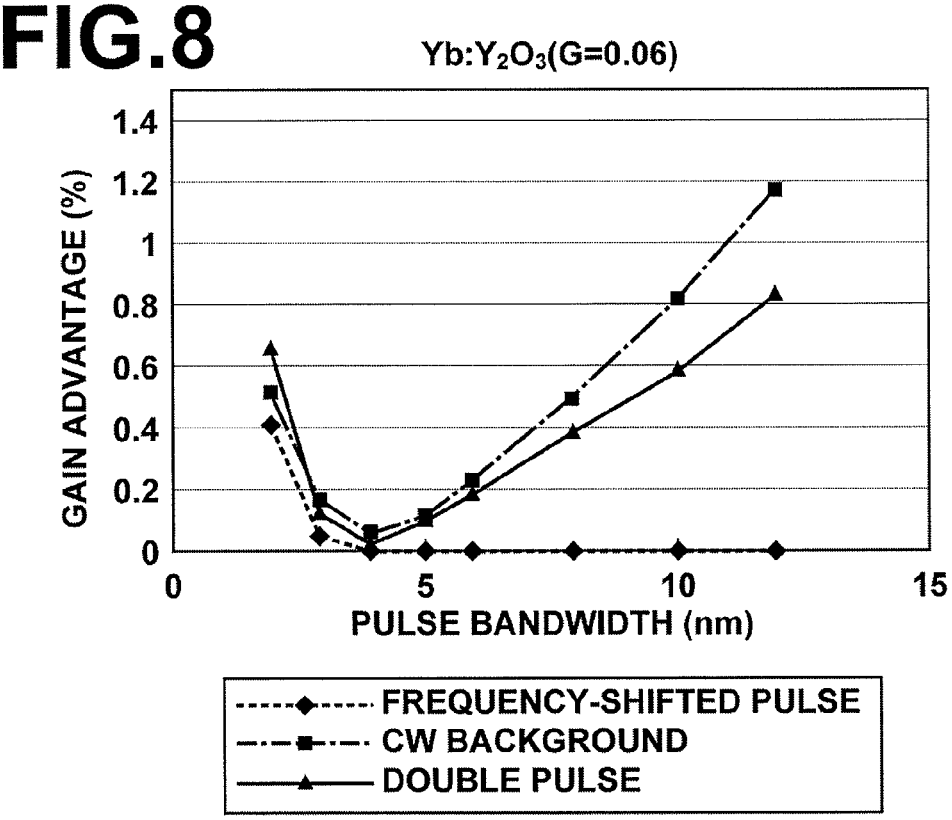
FIG. 8 is a graph indicating examples of relationships between the pulse bandwidth and the gain advantages of pulses and a background competing with mode-locked soliton pulses in a mode-locked solid-state laser apparatus in which the solid-state laser medium is Yb:$Y_2O_3$ and the gain G of the mode-locked soliton pulses is 0.06.

FIG. 8 is a graph indicating examples of the dependences of the gain advantages ΔG, on the spectral bandwidth (wavelength bandwidth) $\Delta\lambda_P$, of pulses and a background competing with mode-locked soliton pulses in a mode-locked solid-state laser apparatus having the configuration illustrated in FIG. 1 in which the solid-state laser medium 15 is Yb:Y$_2$O$_3$. The dependences of FIG. 8 are also obtained by numerical calculation in a similar manner to FIG. 3. In the numerical calculation for obtaining the dependences of FIG. 8, the gain G of the mode-locked soliton pulses is assumed to be 0.06.

On the basis of the dependences of the gain advantages ΔG indicated in FIG. 8, it is understood that a bandwidth which realizes stable generation of mode-locked soliton pulses can be obtained when the saturation parameter S is 4 and the depth ΔR of the absorbing modulation is equal to or greater than 0.4%. For example, in the case where ΔR=0.8%, the double pulses and the CW background can be suppressed when the bandwidth is 4 to 6 nm. While the bandwidth which suppresses the double pulses and the CW background when ΔR=0.4% is limited to only the vicinity of 4 nm, the double pulses and the CW background can be suppressed in a wider range of bandwidths when ΔR=0.8%.

In addition, since the nonlinear refractive index $n_2$ (=1.16×10$^{-19}$ m$^2$/W) of Yb:Y$_2$O$_3$, is approximately 1.3 times the nonlinear refractive index $n_2$ of Yb:KYW, the preferable range of the magnitude of the total intracavity dispersion D in the mode-locked solid-state laser apparatus in which Yb:Y$_2$O$_3$ is used is approximately 1.3 times the preferable range of the magnitude of the total intracavity dispersion D in the mode-locked solid-state laser apparatus in which Yb:KYW is used. That is, the total intracavity dispersion D in the mode-locked solid-state laser apparatus in which Yb:Y$_2$O$_3$ is used is preferably equal to or greater than −3250 fsec$^2$ and smaller than 0 fsec$^2$.

Figure 9:
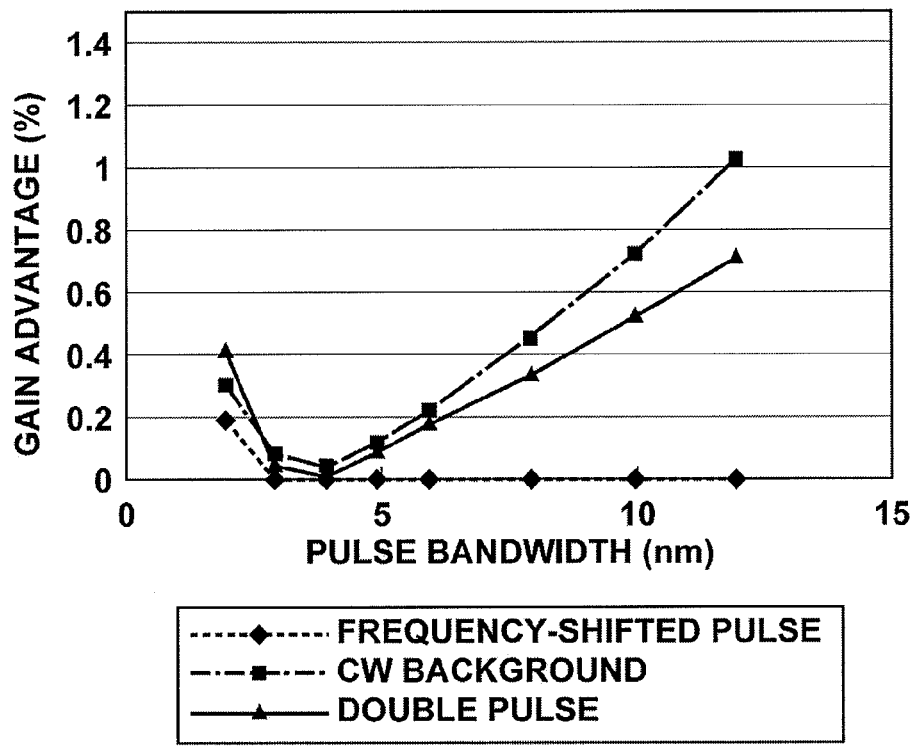
FIG. 9 is a graph indicating examples of relationships between the pulse bandwidth and the gain advantages of pulses and a background competing with mode-locked soliton pulses in a mode-locked solid-state laser apparatus in which the solid-state laser medium is Yb:$Lu_2O_3$ and the gain G of the mode-locked soliton pulses is 0.05.

FIG. 9 is a graph indicating examples of the dependences of the gain advantages ΔG, on the spectral bandwidth (wavelength bandwidth) $\Delta\lambda_P$, of pulses and a background competing with mode-locked soliton pulses in a mode-locked solid-state laser apparatus having the configuration illustrated in FIG. 1 in which the solid-state laser medium 15 is Yb:Lu$_2$O$_3$. The dependences of FIG. 9 are also obtained by numerical calculation in a similar manner to FIG. 3. In the numerical calculation for obtaining the dependences of FIG. 9, the gain G of the mode-locked soliton pulses is assumed to be 0.05.

On the basis of the dependences of the gain advantages ΔG indicated in FIG. 9, it is understood that a bandwidth which realizes stable generation of mode-locked soliton pulses can be obtained when the saturation parameter S is 4 and the depth ΔR of the absorbing modulation is equal to or greater than 0.4%. When the depth ΔR of the absorbing modulation is further increased, the mode-locked soliton pulses can be stably generated in a wider range of bandwidths.

In addition, since the nonlinear refractive index $n_2$ (=1.0×10$^{-19}$ m$^2$/W) of Yb:Lu$_2$O$_3$, is approximately 1.2 times the nonlinear refractive index $n_2$ of Yb:KYW, the preferable range of the magnitude of the total intracavity dispersion D in the mode-locked solid-state laser apparatus in which Yb:Lu$_2$O$_3$ is used is approximately 1.2 times the preferable range of the magnitude of the total intracavity dispersion D in the mode-locked solid-state laser apparatus in which Yb:KYW is used. That is, the total intracavity dispersion D in the mode-locked solid-state laser apparatus in which Yb:Lu$_2$O$_3$ is used is preferably equal to or greater than −3000 fsec$^2$ and smaller than 0 fsec$^2$.

Further, since Yb:Sc$_2$O$_3$ has an identical crystal structure and an approximately equivalent nonlinear refractive index to Yb:Lu$_2$O$_3$. Therefore, the condition imposed, for realizing stable generation of mode-locked soliton pulses, on the mode-locked solid-state laser apparatus using Yb:Sc$_2$O$_3$ is similar to the condition imposed on the mode-locked solid-state laser apparatus using Yb:Lu$_2$O$_3$.

Figure 10:
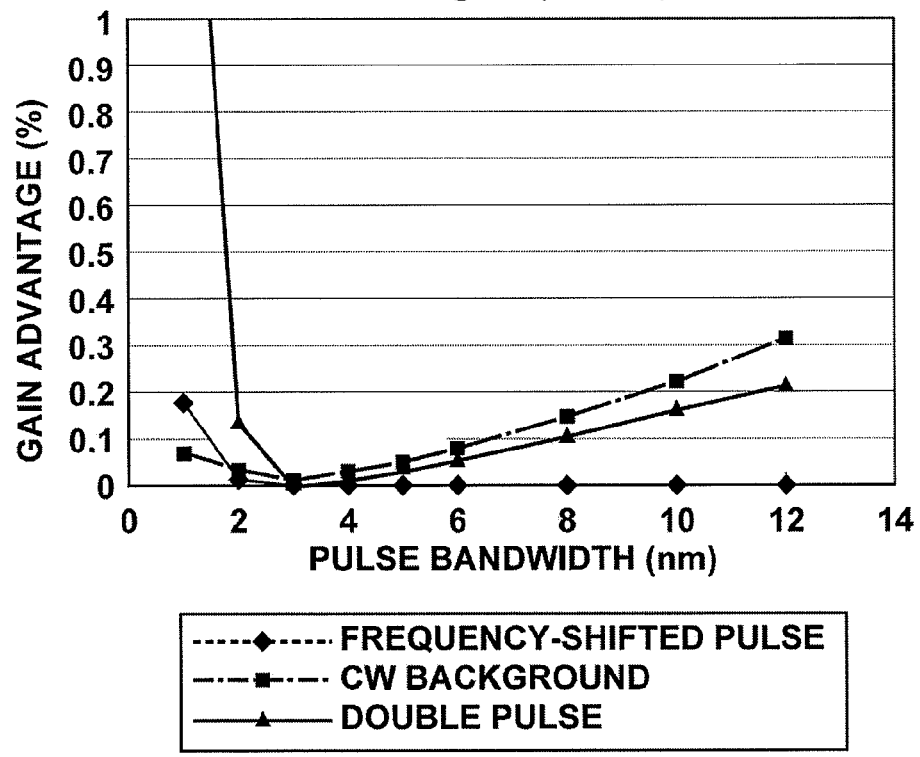
FIG. 10 is a graph indicating examples of relationships between the pulse bandwidth and the gain advantages of pulses and a background competing with mode-locked soliton pulses in a mode-locked solid-state laser apparatus in which the solid-state laser medium is Er, Yb: glass and the gain G of the mode-locked soliton pulses is 0.02.

FIG. 10 is a graph indicating examples of the dependences of the gain advantages ΔG, on the spectral bandwidth (wavelength bandwidth) Δλ$_P$, of pulses and a background competing with mode-locked soliton pulses in a mode-locked solid-state laser apparatus having the configuration illustrated in FIG. 1 in which the solid-state laser medium 15 is Er,Yb-codoped phosphate glass. The dependences of FIG. 10 are also obtained by numerical calculation in a similar manner to FIG. 3. In the numerical calculation for obtaining the dependences of FIG. 10, the gain G of the mode-locked soliton pulses is assumed to be 0.02.

In the Er,Yb-codoped phosphate glass, the excitation light is absorbed by the Yb ions, and the excitation energy is transferred from the Yb ions to the Er ions. Since the phonon energy of the phosphate glass is relatively great, Er ions at the excited level $^4$I$_{11/2}$ last relax to the upper laser level $^4$I$_{13/2}$. Thus, inverted population can be formed with high efficiency. In this case, the excitation light has the wavelength of approximately 980 nm, and the oscillating light has the wavelength of approximately 1550 nm.

Figure 11:
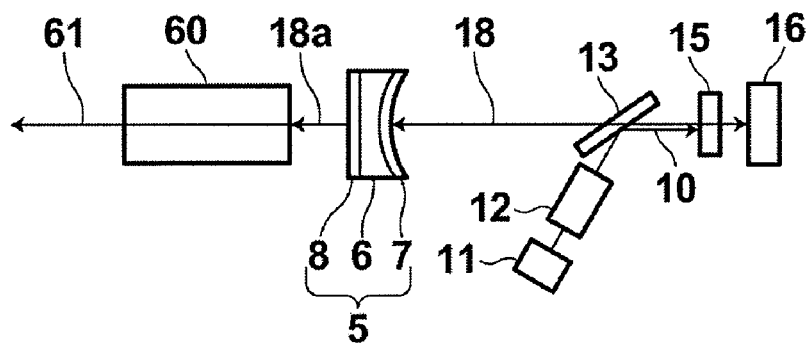
FIG. 11 is a schematic side view illustrating an exemplary configuration of a mode-locked solid-state laser apparatus according to an embodiment of the present invention.

In the case where the Er,Yb-codoped phosphate glass is used as the solid-state laser medium 15 in the mode-locked solid-state laser apparatus of FIG. 1, it is possible to obtain the oscillating light 18 having a wavelength of 1550 nm to 1600 nm. Alternatively, in the case where the mode-locked solid-state laser apparatus having the configuration as illustrated in FIG. 11 is used, it is possible to obtain the second harmonic wave 61 having a wavelength of 780 nm to 800 nm. The configuration of FIG. 11 is different from the configuration of FIG. 1 in that a nonlinear optical crystal 60 is arranged on the outside of the configuration of FIG. 1, so that the oscillating light 18a outputted through the negative-dispersion mirror 5 enters the nonlinear optical crystal 60, and the second harmonic wave 61 is generated. The conventional solid-state laser apparatuses emitting light at the wavelength around 800 nm need, for example, a crystal doped with a transmission metal such as Ti:Sapphire and a green laser which emits light at the wavelength of 532 nm. On the other hand, the mode-locked solid-state laser apparatus of FIG. 11 is advantageous in that excitation with a semiconductor laser in the infrared band and utilization of inherently-high-efficiency transition in a rare-earth element are enabled.

In the Er,Yb-codoped phosphate glass, the frequency-shifted pulses can be suppressed to approximately zero when the pulse bandwidth is 2 nm or greater. In practice, it is preferable to realize mode locking with soliton pulses having a short pulse width of 600 fsec or smaller. Therefore, it is preferable that the pulse bandwidth be approximately 4 nm (corresponding to the pulse width of 600 fsec) or greater.

In addition, since the nonlinear refractive index n$_2$ (=3× 10$^{-20}$ m$^2$/W) of Er,Yb-codoped phosphate glass is small, the total intracavity dispersion D in the mode-locked solid-state laser apparatus in which Er,Yb-codoped phosphate glass is used is preferably equal to or greater than −1200 fsec$^2$ and smaller than 0 fsec$^2$.

Figure 12:
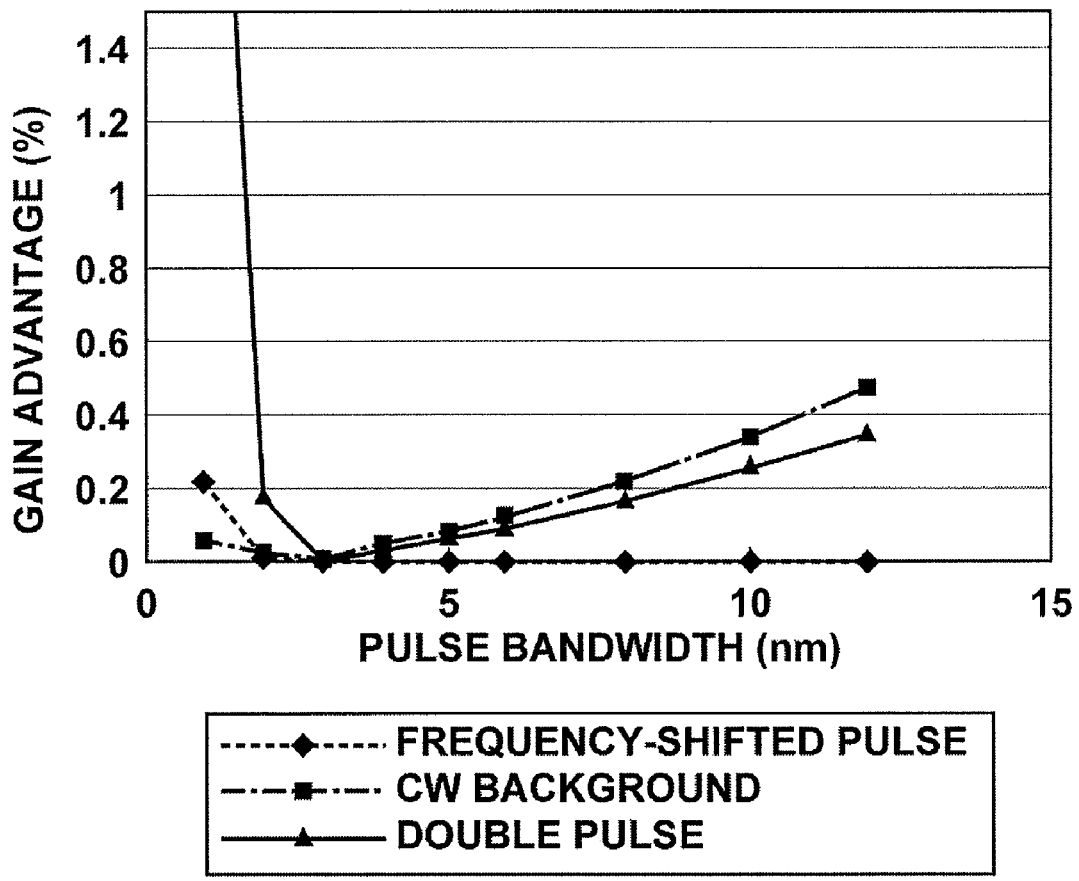
FIG. 12 is a graph indicating examples of relationships between the pulse bandwidth and the gain advantages of pulses and a background competing with mode-locked soliton pulses in a mode-locked solid-state laser apparatus in which the solid-state laser medium is Nd:glass and the gain G of the mode-locked soliton pulses is 0.03.

The condition on the total intracavity dispersion D in the mode-locked solid-state laser apparatus in which Nd-doped laser glass is used as the solid-state laser medium 15 can be obtained in a similar manner to the condition in the case where Er, Yb-codoped phosphate glass is used. For example, FIG. 12 is a graph indicating examples of the dependences of the gain advantages ΔG, on the spectral bandwidth (wavelength bandwidth) Δλ$_P$, of pulses and a background competing with mode-locked soliton pulses in a mode-locked solid-state laser apparatus having the configuration illustrated in FIG. 1 in which the solid-state laser medium 15 is Nd-doped phosphate glass. The dependences of FIG. 12 are also obtained by numerical calculation in a similar manner to FIG. 3. In the numerical calculation for obtaining the dependences of FIG. 12, the gain G of the mode-locked soliton pulses is assumed to be 0.03.

For the reason explained before, it is preferable that the depth ΔR of the absorbing modulation be equal to or greater than 0.4%. Since the nonlinear refractive index n$_2$ (=2.8× 10$^{-20}$ m$^2$/W) of Nd-doped phosphate glass is small, the total intracavity dispersion D in the mode-locked solid-state laser apparatus in which Nd-doped phosphate glass is used is preferably equal to or greater than −800 fsec$^2$ and smaller than 0 fsec$^2$.

7. Examples of Negative-Dispersion Mirror

Hereinbelow, the layers constituting the concrete examples 1 to 10 of the negative-dispersion mirror are explained with reference to FIGS. 13A, 13B, 14A, 14B, 15A, 15B, 16A, 16B, 17A, 17B, 18A, 18B, 19A, 19B, 20A, 20B, 21A, 21B, 22A, and 22B. Each of FIGS. 13A, 14A, 15A, 16A, 17A, 18A, 19A, 20A, 21A, and 22A indicates the optical thicknesses of the films constituting one of the concrete examples 1 to 10 of the negative-dispersion mirror, where the optical thicknesses are determined on the basis of the central wavelength. Each of FIGS. 13B, 14B, 15B, 16B, 17B, 18B, 19B, 20B, 21B, and 22B is a graph indicating the reflectance and the negative dispersion which are estimated, by simulation, to be realized by the layered structure of one of the concrete examples 1 to 10 of the negative-dispersion mirror. The concrete examples 1 to 10 are designed on the assumption that the solid-state laser medium 15 is Yb:KYW and the central wavelength is 1045 nm.

In each of FIGS. 13A, 14A, 15A, 16A, 17A, 18A, 19A, 20A, 21A, and 22A, the layer numbers are indicated along the abscissa, and the optical thickness n·d normalized by λ/4 is indicated along the ordinate. The first layer is the nearest to the substrate, and the fiftieth layer is the farthest from the substrate. In each of FIGS. 13B, 14B, 15B, 16B, 17B, 18B, 19B, 20B, 21B, and 22B, the wavelength (nm) of the light L is indicated along the abscissa, and the reflectance (%) and the negative dispersion (fsec$^2$) are indicated along the ordinate.

Figure 13A:
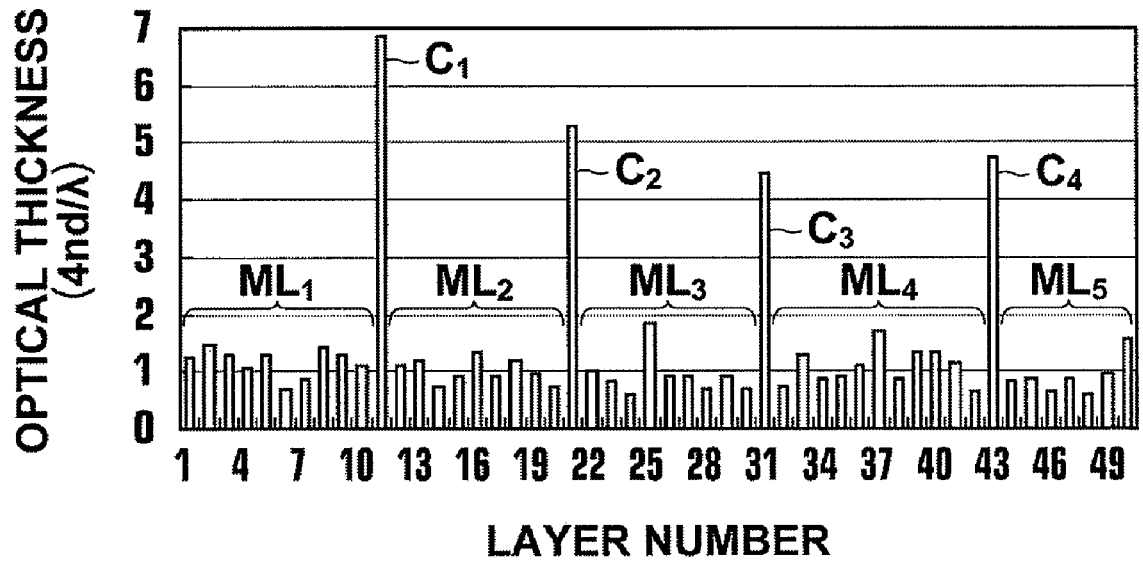
FIG. 13A is a diagram indicating the optical thicknesses of the films constituting a concrete example 1 of a negative-dispersion mirror.
Figure 13B:
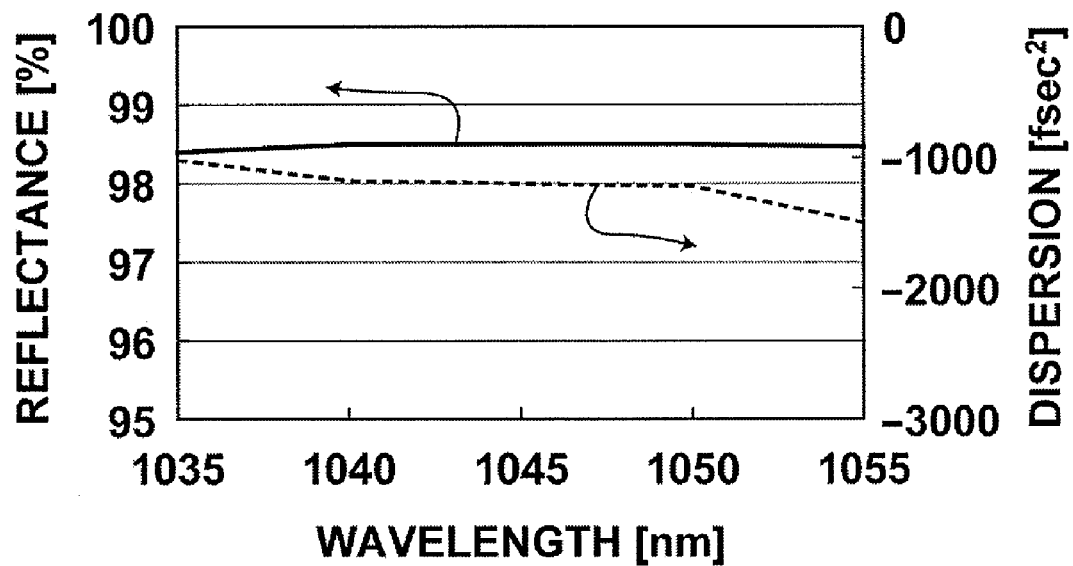
FIG. 13B is a diagram indicating the reflectance and the dispersion in the concrete example 1 of the negative-dispersion mirror.

Referring to FIG. 13A, in the concrete example 1 of the negative-dispersion mirror, the first to tenth layers constitute the multilayer mirror ML$_1$, the eleventh layer realizes the cavity layer C$_1$, the twelfth to twentieth layers constitute the multilayer mirror ML$_2$, the twenty-first layer realizes the cavity layer C$_2$, the twenty-second to thirtieth layers constitute the multilayer mirror ML$_3$, the thirty-first layer realizes the cavity layer C$_3$, the thirty-second to forty-second layers constitute the multilayer mirror ML$_4$, the forty-third layer realizes the cavity layer C$_4$, and the forty-fourth to fiftieth layers constitute the multilayer mirror ML$_5$. That is, the multilayer mirrors ML$_1$, ML$_2$, ML$_3$, ML$_4$, and ML$_5$ are respectively constituted by the ten, nine, nine, eleven, and seven layers, so that the intervals between the cavity layers C$_1$ and C$_2$, the cavity layers C$_2$ and C$_3$, and the cavity layers C$_3$ and C$_4$ are respectively nine, nine, and eleven layers, and the average interval is 9.6 layers. Therefore, it is possible to determine that the cavity layers $C_1$ to $C_4$ are approximately equally spaced. In addition, as indicated in FIG. 13B, the negative-dispersion mirror having the layered structure indicated in FIG. 13A exhibits the reflectance of 98.5% and imparts to the light the negative mirror dispersion of −1200 fsec² at least in the wavelength band of 1040 to 1050 nm.

Figure 14A:
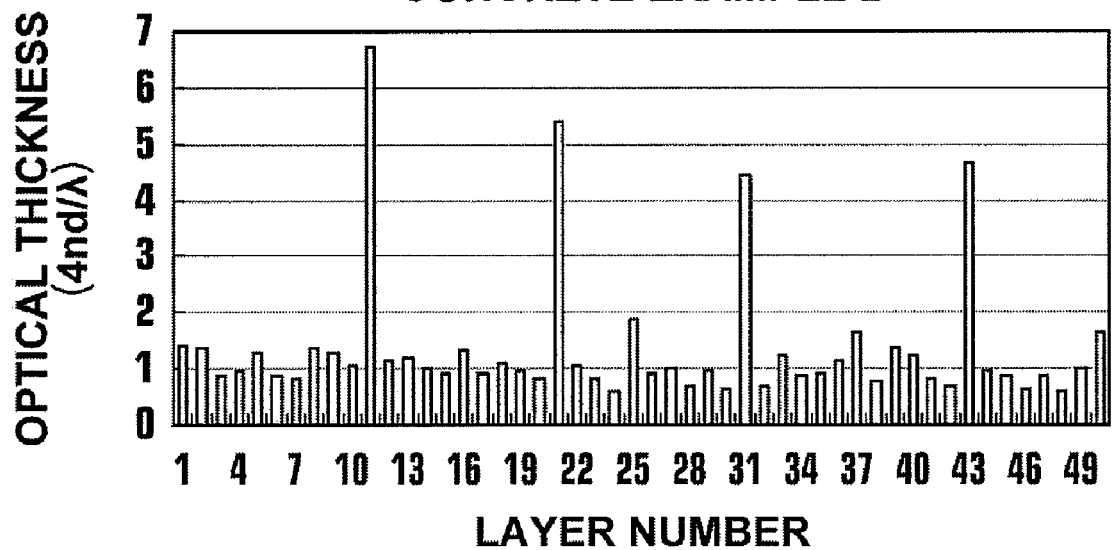
FIG. 14A is a diagram indicating the optical thicknesses of the films constituting a concrete example 2 of a negative-dispersion mirror.
Figure 14B:
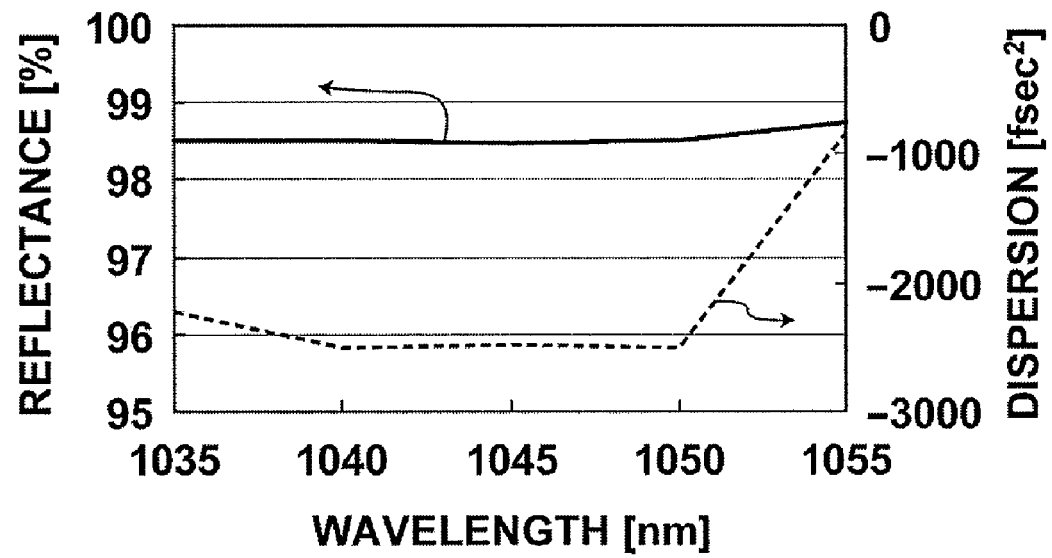
FIG. 14B is a diagram indicating the reflectance and the dispersion in the concrete example 2 of the negative-dispersion mirror.

Referring to FIG. 14A, the number of the multilayer mirrors and the number of the cavity layers in the concrete example 2 of the negative-dispersion mirror are respectively identical to the corresponding numbers in the concrete example 1. In addition, the optical thicknesses of the cavity layers constituting the dielectric multilayer structure in the concrete example 2 of the negative-dispersion mirror are respectively approximately identical to the optical thicknesses of the corresponding cavity layers in the concrete example 1. However, the optical thicknesses of the multilayer mirrors $ML_1$ and $ML_2$ located on the substrate side in the concrete example 2 of the negative-dispersion mirror are different from the optical thicknesses of the corresponding multilayer mirrors $ML_1$ and $ML_2$ in the concrete example 1. In addition, as indicated in FIG. 14B, the negative-dispersion mirror having the layered structure indicated in FIG. 14A exhibits the reflectance of 98.5% and imparts to the light the negative mirror dispersion of −2500 fsec² at least in the wavelength band of 1040 to 1050 nm.

As indicated above, although the concrete examples 1 and 2 have similar layer structures, the negative mirror dispersions −1200 fsec² and −2500 fsec², which are imparted to the light by the concrete examples 1 and 2, are greatly different in the wavelength band of 1040 to 1050 nm.

Figure 15A:
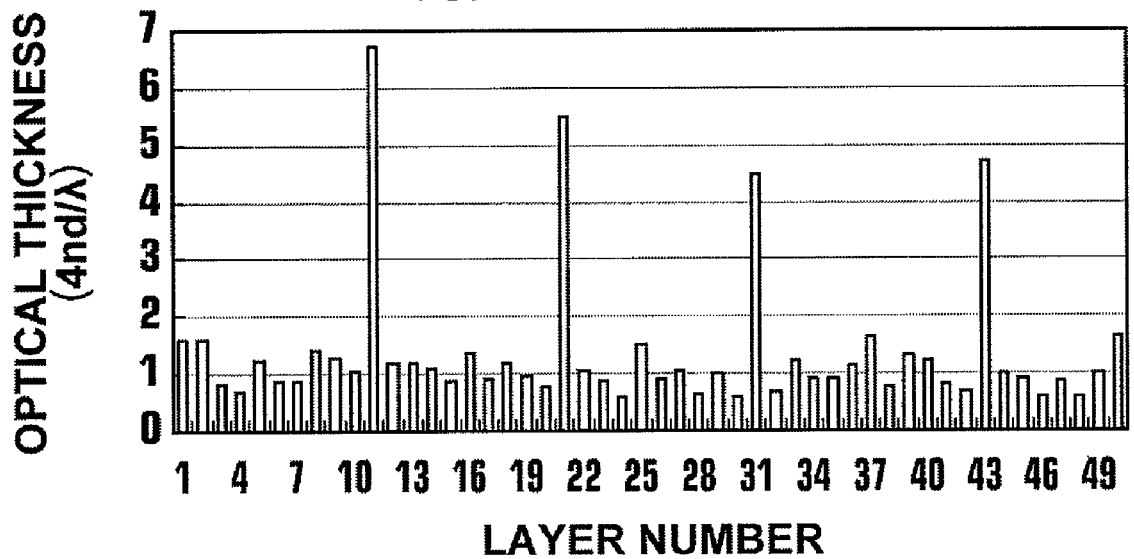
FIG. 15A is a diagram indicating the optical thicknesses of the films constituting a concrete example 3 of a negative-dispersion mirror.
Figure 15B:
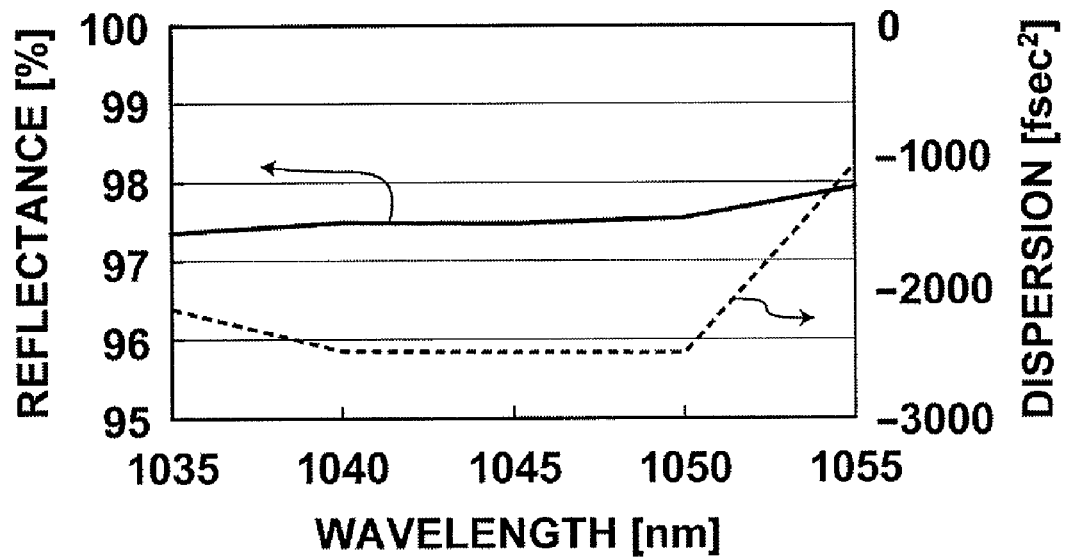
FIG. 15B is a diagram indicating the reflectance and the dispersion in the concrete example 3 of the negative-dispersion mirror.

Referring to FIG. 15A, the number of the multilayer mirrors and the number of the cavity layers in the concrete example 3 of the negative-dispersion mirror are respectively identical to the corresponding numbers in the concrete example 1. In addition, the optical thicknesses of the cavity layers constituting the dielectric multilayer structure in the concrete example 3 of the negative-dispersion mirror are respectively approximately identical to the optical thicknesses of the corresponding cavity layers in the concrete example 1. However, the optical thicknesses of the multilayer mirrors $ML_1$ and $ML_2$ located on the substrate side in the concrete example 3 of the negative-dispersion mirror are different from the optical thicknesses of the corresponding multilayer mirrors $ML_1$ and $ML_2$ in the concrete examples 1 and 2. In addition, as indicated in FIG. 15B, the negative-dispersion mirror having the layered structure indicated in FIG. 15A exhibits the reflectance of 97.5% and imparts to the light the negative mirror dispersion of −2500 fsec² at least in the wavelength band of 1040 to 1050 nm.

As indicated above, although the concrete examples 2 and 3 have similar layer structures, the reflectances 98.5% and 97.5% in the concrete examples 2 and 3 are different in the wavelength band of 1040 to 1050 nm.

Figure 16A:
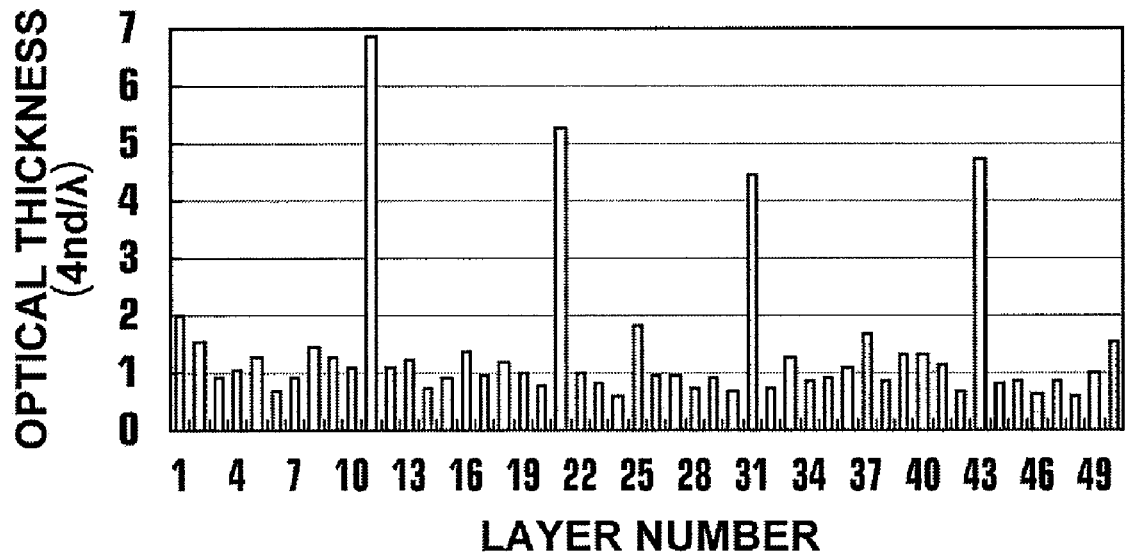
FIG. 16A is a diagram indicating the optical thicknesses of the films constituting a concrete example 4 of a negative-dispersion mirror.
Figure 16B:
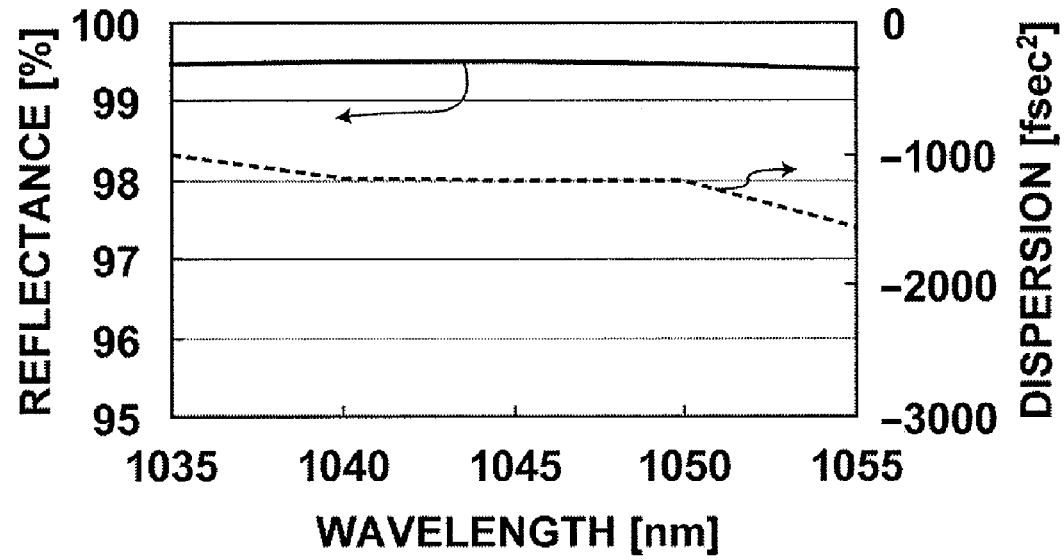
FIG. 16B is a diagram indicating the reflectance and the dispersion in the concrete example 4 of the negative-dispersion mirror.

Referring to FIG. 16A, the number of the multilayer mirrors and the number of the cavity layers in the concrete example 4 of the negative-dispersion mirror are respectively identical to the corresponding numbers in the concrete example 1. In addition, the optical thicknesses of the cavity layers constituting the dielectric multilayer structure in the concrete example 4 of the negative-dispersion mirror are respectively approximately identical to the optical thicknesses of the corresponding cavity layers in the concrete example 1. However, the optical thicknesses of the multilayer mirrors $ML_1$ and $ML_2$ located on the substrate side in the concrete example 4 of the negative-dispersion mirror are different from the optical thicknesses of the corresponding multilayer mirrors $ML_1$ and $ML_2$ in the concrete example 1. In addition, as indicated in FIG. 16B, the negative-dispersion mirror having the layered structure indicated in FIG. 16A exhibits the reflectance of 99.5% and imparts to the light the negative mirror dispersion of −1200 fsec² at least in the wavelength band of 1040 to 1050 nm.

As indicated above, although the concrete examples 1 to 4 are identical in the positions of the cavity layers $C_1$, $C_2$, $C_3$, and $C_4$ (indicated by the layer numbers in FIGS. 13A, 14A, 15A, and 16A) and the numbers of layers constituting the multilayer mirrors $ML_1$, $ML_2$, $ML_3$, $ML_4$, and $ML_5$, and are approximately identical in the optical thicknesses of the cavity layers, the properties of the concrete examples 1 to 4 are greatly different.

The concrete examples 5 to 8 of the negative-dispersion mirror, the layer structures of which are indicated in FIGS. 17A, 18A, 19A, and 20A, are approximately identical to the concrete example 1 in the positions (i.e., the layer numbers) and the numbers of the layers realizing the second to fifth multilayer mirrors $ML_2$, $ML_3$, $ML_4$, and $ML_5$ and the cavity layers $C_1$, $C_2$, $C_3$, and $C_4$, and are approximately identical in the optical thicknesses of the cavity layers. However, the concrete examples 5 to 8 are different from the concrete example 1 in that the optical thickness of the first layer of the dielectric multilayer structure adjacent to the substrate in each of concrete examples 5 to 8 is much greater than the first layer of the dielectric multilayer structure in the concrete example 1, and the first multilayer mirror $ML_1$ in each of concrete examples 5 to 8 is constituted by the second to tenth layers of the dielectric multilayer structure.

Figure 17A:
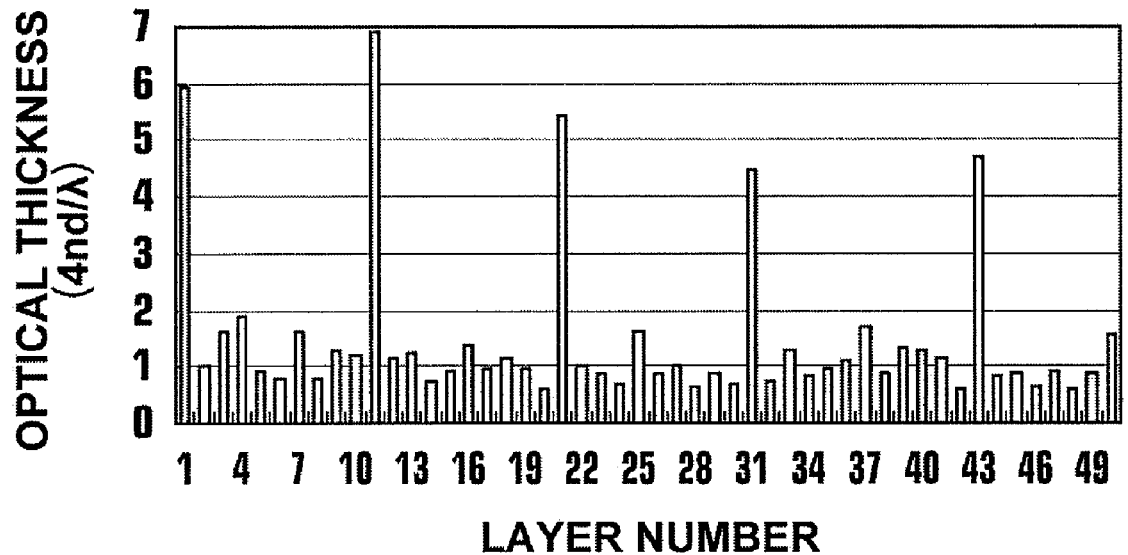
FIG. 17A is a diagram indicating the optical thicknesses of the films constituting a concrete example 5 of a negative-dispersion mirror.
Figure 17B:
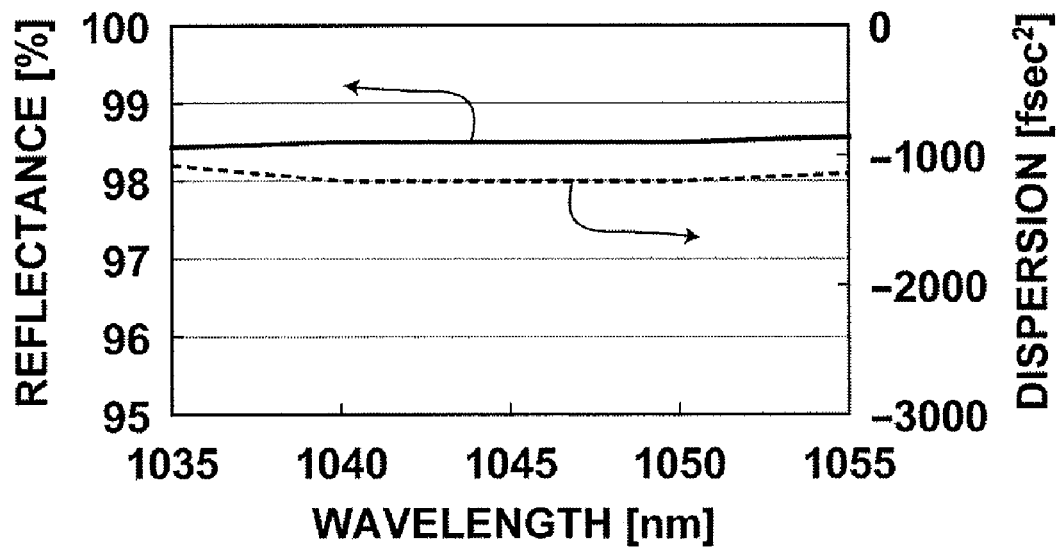
FIG. 17B is a diagram indicating the reflectance and the dispersion in the concrete example 5 of the negative-dispersion mirror.

As indicated in FIG. 17B, the negative-dispersion mirror having the layered structure indicated in FIG. 17A exhibits the reflectance of 98.5% and imparts to the light the negative mirror dispersion of −1200 fsec² at least in the wavelength band of 1040 to 1050 nm.

Figure 18A:
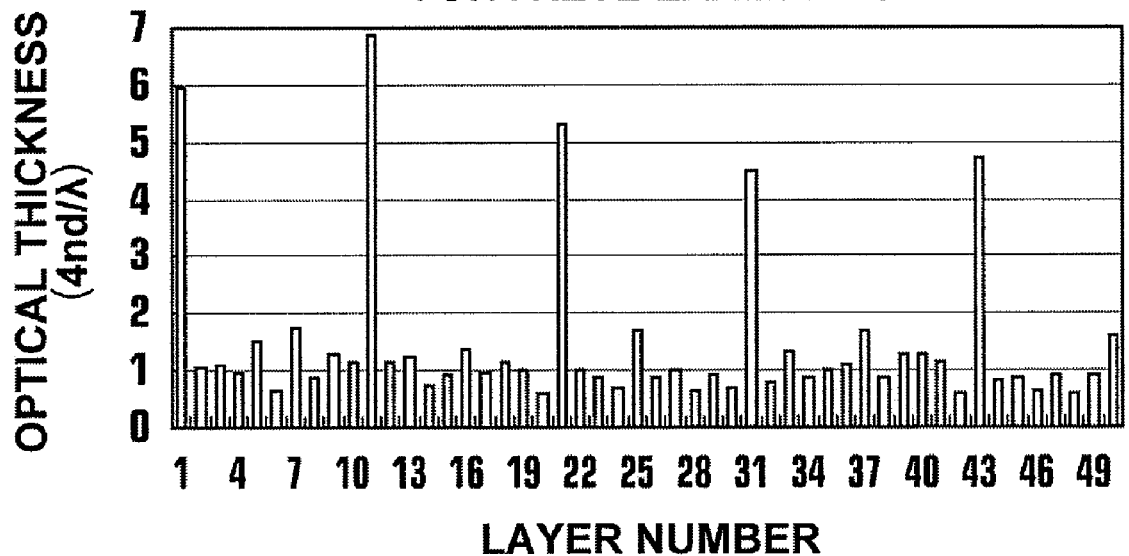
FIG. 18A is a diagram indicating the optical thicknesses of the films constituting a concrete example 6 of a negative-dispersion mirror.
Figure 18B:
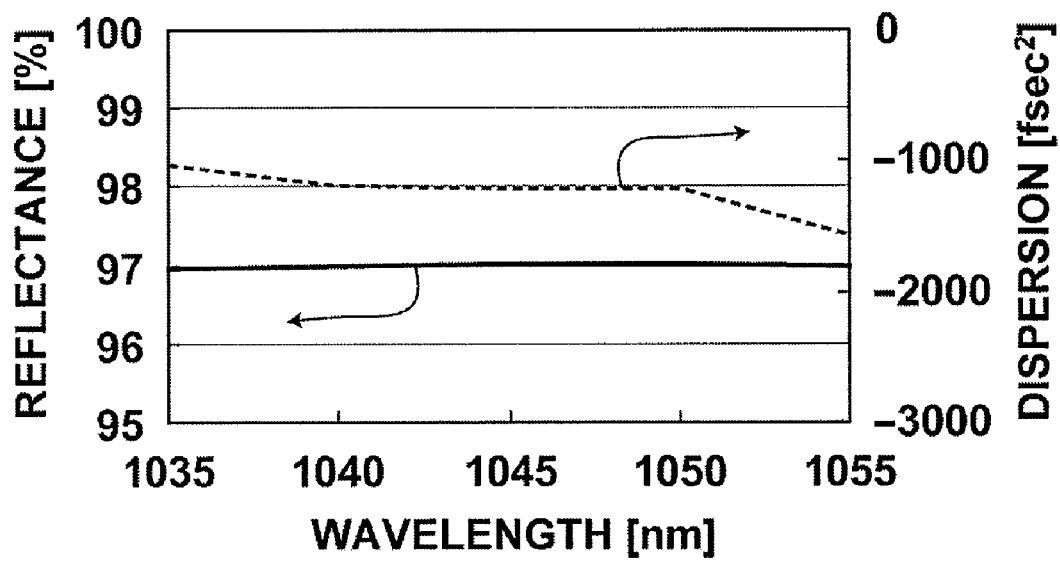
FIG. 18B is a diagram indicating the reflectance and the dispersion in the concrete example 6 of the negative-dispersion mirror.

As indicated in FIG. 18B, the negative-dispersion mirror having the layered structure indicated in FIG. 18A exhibits the reflectance of 97% and imparts to the light the negative mirror dispersion of −1200 fsec² at least in the wavelength band of 1040 to 1050 nm.

Figure 19A:
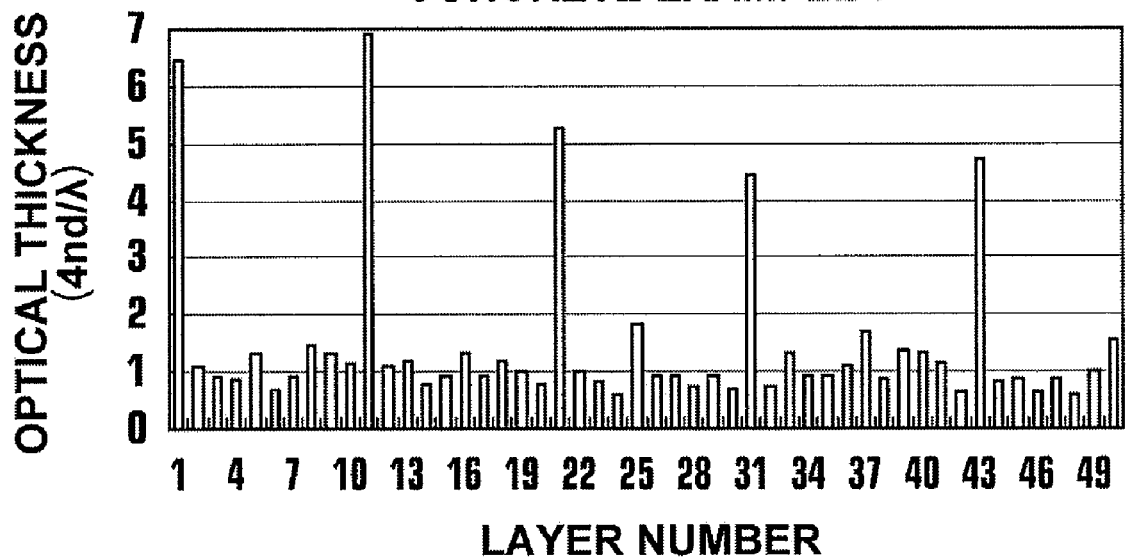
FIG. 19A is a diagram indicating the optical thicknesses of the films constituting a concrete example 7 of a negative-dispersion mirror.
Figure 19B:
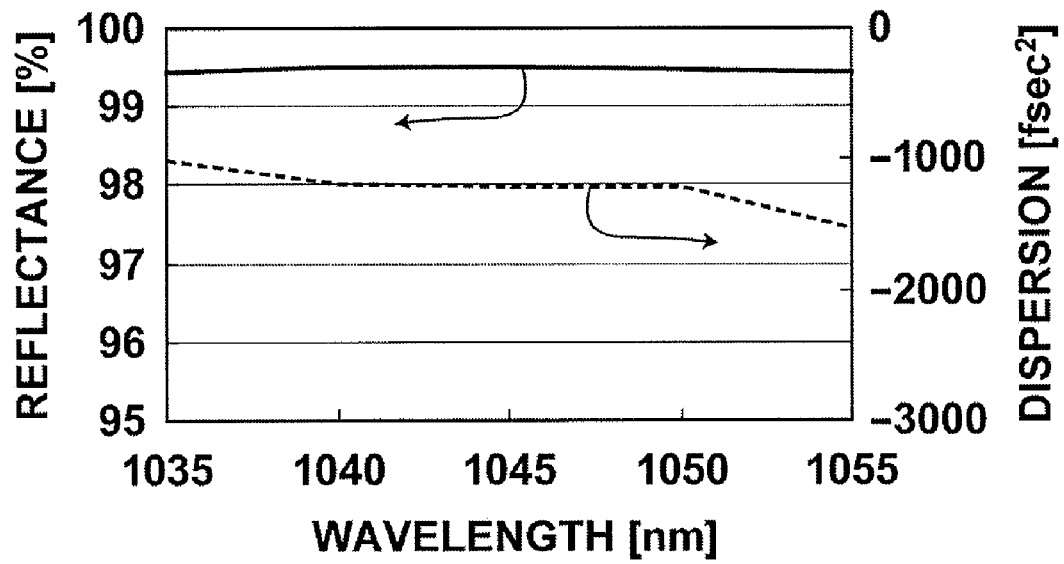
FIG. 19B is a diagram indicating the reflectance and the dispersion in the concrete example 7 of the negative-dispersion mirror.

As indicated in FIG. 19B, the negative-dispersion mirror having the layered structure indicated in FIG. 19A exhibits the reflectance of 99.5% and imparts to the light the negative mirror dispersion of −1200 fsec² at least in the wavelength band of 1040 to 1050 nm.

Figure 20A:
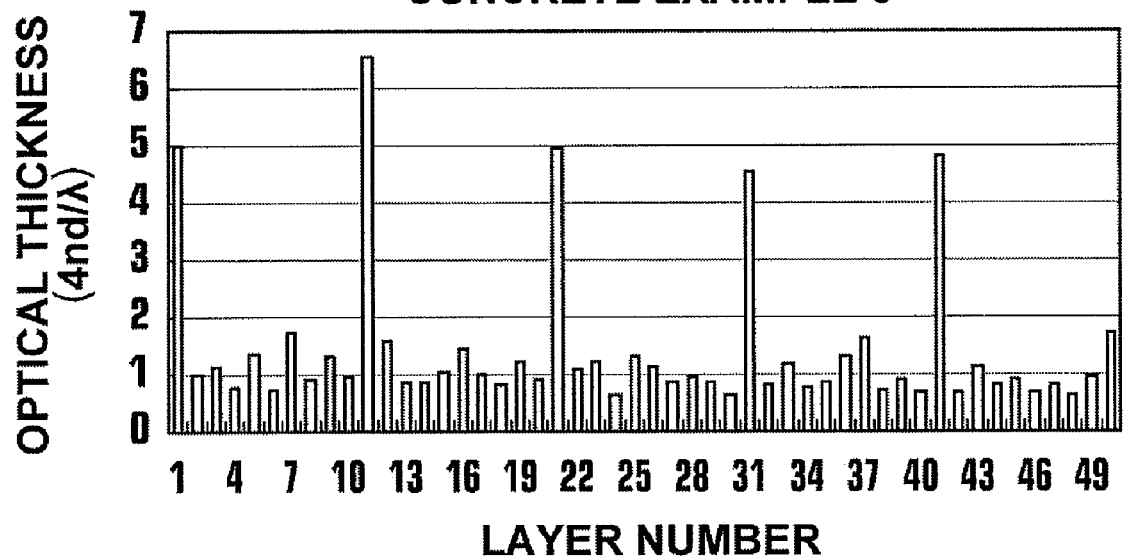
FIG. 20A is a diagram indicating the optical thicknesses of the films constituting a concrete example 8 of a negative-dispersion mirror.
Figure 20B:
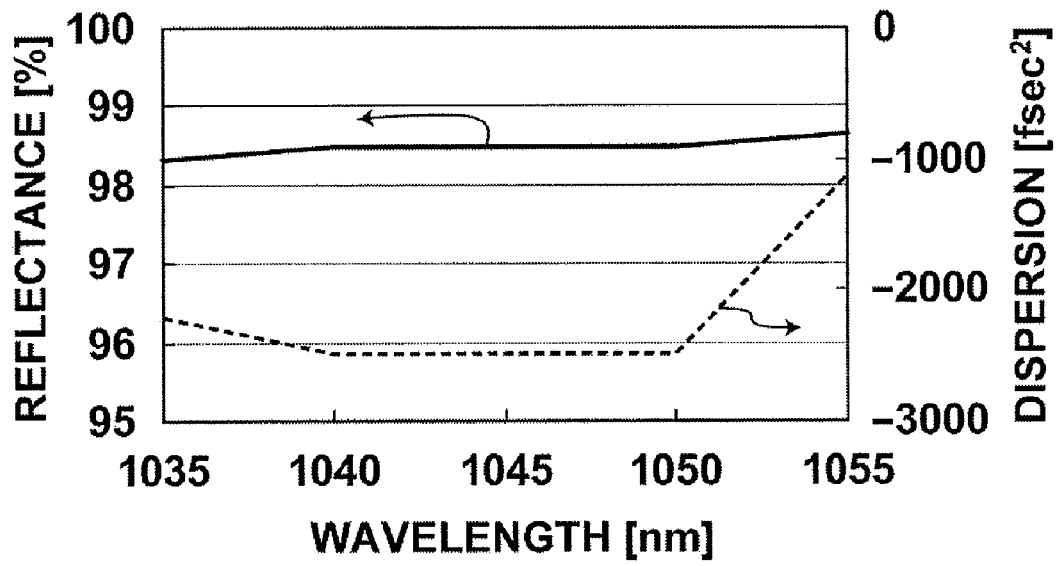
FIG. 20B is a diagram indicating the reflectance and the dispersion in the concrete example 8 of the negative-dispersion mirror.

As indicated in FIG. 20B, the negative-dispersion mirror having the layered structure indicated in FIG. 20A exhibits the reflectance of 98.5% and imparts to the light the negative mirror dispersion of −2500 fsec² at least in the wavelength band of 1040 to 1050 nm.

That is, even the negative-dispersion mirrors in which the optical thickness of the first layer of the dielectric multilayer structure adjacent to the substrate is great can exhibit the reflectance of 97% to 99.5%, and impart the negative mirror dispersion of −3000 fsec² to −600 fsec², as well as the negative-dispersion mirrors (such as the concrete examples 1 to 4) in which the optical thickness of the first layer of the dielectric multilayer structure adjacent to the substrate is not great.

Figure 21A:
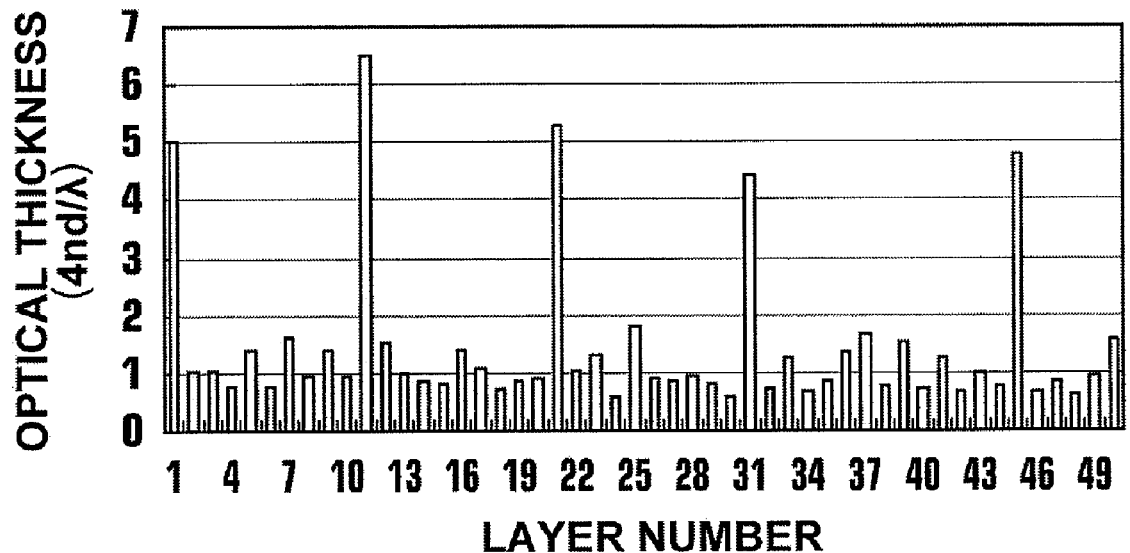
FIG. 21A is a diagram indicating the optical thicknesses of the films constituting a concrete example 9 of a negative-dispersion mirror.
Figure 21B:
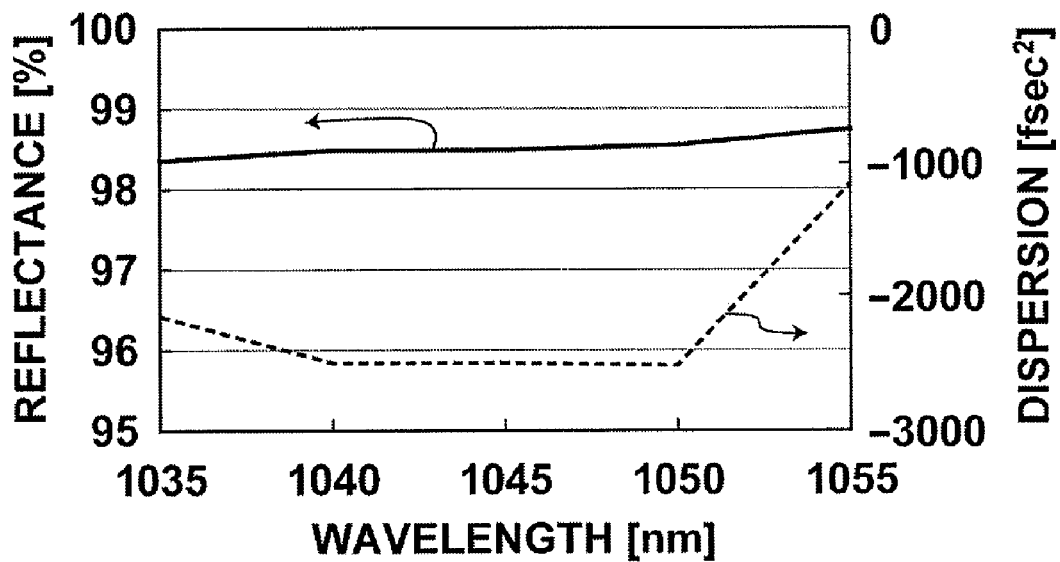
FIG. 21B is a diagram indicating the reflectance and the dispersion in the concrete example 9 of the negative-dispersion mirror.

The dielectric multilayer structure in the concrete example 9 of the negative-dispersion mirror having the layered structure indicated in FIG. 21A is similar to the concrete examples 5 to 8 in that the optical thickness of the first layer of the dielectric multilayer structure adjacent to the substrate is great. In the concrete example 9 of the negative-dispersion mirror, a layer having a very great thickness is formed as the first layer of the dielectric multilayer structure adjacent to the substrate, the second to tenth layers constitute the multilayer mirror $ML_1$, the eleventh layer realizes the cavity layer $C_1$, the twelfth to twentieth layers constitute the multilayer mirror $ML_2$, the twenty-first layer realizes the cavity layer $C_2$, the twenty-second to thirtieth layers constitute the multilayer mirror $ML_3$, the thirty-first layer realizes the cavity layer $C_3$, the thirty-second to forty-fourth layers constitute the multilayer mirror $ML_4$, the forty-fifth layer realizes the cavity layer $C_4$, and the forty-sixth to fiftieth layers constitute the multilayer mirror $ML_5$. That is, the multilayer mirrors $ML_1$, $ML_2$, $ML_3$, $ML_4$, and $ML_5$ are respectively constituted by the nine, nine, nine, thirteen, and five layers, so that the intervals between the cavity layers $C_1$ and $C_2$, the cavity layers $C_2$ and $C_3$, and the cavity layers $C_3$ and $C_4$ are respectively nine, nine, and thirteen layers, and the average interval is 10.3 layers, and the intervals between the adjacent ones of the cavity layers are within ±30% of the average interval. Therefore, it is possible to determine that the cavity layers $C_1$ to $C_4$ are approximately equally spaced. In addition, as indicated in FIG. 21B, the negative-dispersion mirror having the layered structure indicated in FIG. 21A exhibits the reflectance of 98.5% and imparts to the light the negative mirror dispersion of −2500 $fsec^2$ at least in the wavelength band of 1040 to 1050 nm.

Figure 22A:
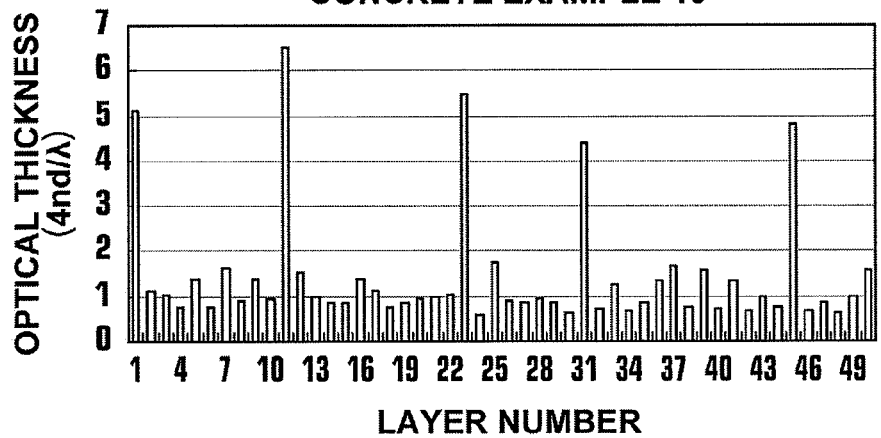
FIG. 22A is a diagram indicating the optical thicknesses of the films constituting a concrete example 10 of a negative-dispersion mirror.
Figure 22B:
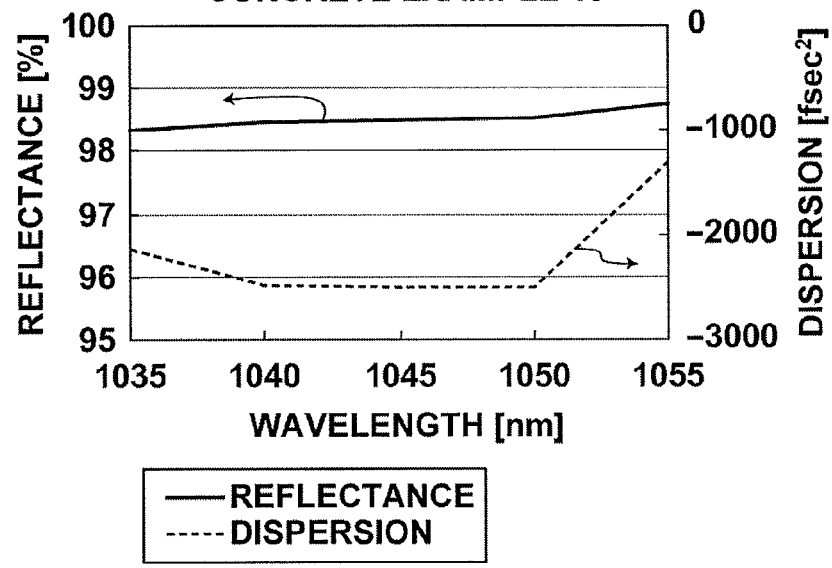
FIG. 22B is a diagram indicating the reflectance and the dispersion in the concrete example 10 of the negative-dispersion mirror.

The dielectric multilayer structure in the concrete example 10 of the negative-dispersion mirror having the layered structure indicated in FIG. 22A is also similar to the concrete examples 5 to 8 in that the optical thickness of the first layer of the dielectric multilayer structure adjacent to the substrate is great. In the concrete example 10 of the negative-dispersion mirror, a layer having a very great thickness is formed as the first layer of the dielectric multilayer structure adjacent to the substrate, the second to tenth layers constitute the multilayer mirror $ML_1$, the eleventh layer realizes the cavity layer $C_1$, the twelfth to twenty-second layers constitute the multilayer mirror $ML_2$, the twenty-third layer realizes the cavity layer $C_2$, the twenty-fourth to thirtieth layers constitute the multilayer mirror $ML_3$, the thirty-first layer realizes the cavity layer $C_3$, the thirty-second to forty-fourth layers constitute the multilayer mirror $ML_4$, the forty-fifth layer realizes the cavity layer $C_4$, and the forty-sixth to fiftieth layers constitute the multilayer mirror $ML_5$. That is, the multilayer mirrors $ML_1$, $ML_2$, $ML_3$, $ML_4$, and $ML_5$ are respectively constituted by the nine, eleven, seven, thirteen, and five layers, so that the intervals between the cavity layers $C_1$ and $C_2$, the cavity layers $C_2$ and $C_3$, and the cavity layers $C_3$ and $C_4$ are respectively eleven, seven, and thirteen layers, and the average interval is 10.3 layers, and the intervals between the adjacent ones of the cavity layers are within ±35% of the average interval. Therefore, it is possible to determine that the cavity layers $C_1$ to $C_4$ are approximately equally spaced. In addition, as indicated in FIG. 22B, the negative-dispersion mirror having the layered structure indicated in FIG. 22A exhibits the reflectance of 98.5% and imparts to the light the negative mirror dispersion of −2500 $fsec^2$ at least in the wavelength band of 1040 to 1050 nm.

As explained above, the concrete examples 8, 9, and 10 are partially different in the locations of the cavity layers, the locations of the multilayer mirrors, and the numbers of the layers constituting the multilayer mirrors. However, as indicated in FIGS. 20B, 21B, and 22B, all of the concrete examples 8, 9, and 10 realize the reflectance of 98.5% and the negative mirror dispersion of −2500 $fsec^2$ in the wavelength band of 1040 to 1050 nm. In addition, all of the concrete examples 8, 9, and 10 exhibit the identical wavelength dependence of the reflectance and the negative mirror dispersion.

In each of the concrete examples 1, 2, 3, and 4, the optical thickness, normalized by $\lambda/4$, of the cavity layers $C_1$, $C_2$, ... $C_m$ is 4 to 7, the optical thickness, normalized by $\lambda/4$, of each of the layers constituting the three or more multilayer mirrors $ML_1$, $ML_2$, ... $ML_{m+1}$ is equal to or greater than 0.5 and smaller than 2. However, the normalized optical thicknesses of the cavity layers $C_1$, $C_2$, ... $C_m$ $C_m$ are not limited to the range of 4 to 7, and may be any values equal to or greater than 2. In addition, the total number of the layers constituting the multilayer structure of the negative-dispersion mirror is not limited to fifty, the number of the multilayer mirrors is not limited to five, and the number of the cavity layers is not limited to four. Further, although the central wavelength is 1045 nm in the case where the solid-state laser medium is Yb:KYW, generally, the central wavelength $\lambda$ is determined according to the solid-state laser medium arranged in the mode-locked solid-state laser apparatus.

Generally, the multilayer structure of the negative-dispersion mirror can be determined as follows.

(1) The central wavelength $\lambda$ is determined according to the solid-state laser medium arranged in the mode-locked solid-state laser apparatus.

(2) A desired value of the mirror dispersion in the range of −3000 $fsec^2$ to −600 $fsec^2$ and a desired value of the reflectance at the negative-dispersion mirror in the range of 97% to 99.5% are set.

(3) Rough estimates of values specifying the multilayer structure and the values of the thicknesses of the layers are set as initial conditions in computer simulation. At this time, the values specifying the multilayer structure include the values of the total number of layers, the refractive indexes (the constituent materials) of the layers, the positions of the cavity layers $C_1$, $C_2$, ... $C_m$, the number of the layers constituting the multilayer mirrors, and the optical thickness of each of the layers constituting the multilayer mirrors. For example, the optical thickness of each of the layers constituting the multilayer mirrors may be set to a value near a quarter of the central wavelength ($\lambda/4$), and the optical thicknesses of the cavity layers $C_1$, $C_2$, ... $C_m$ may be set to a value near an integer multiple a quarter of the central wavelength ($\lambda/4 \times n$).

(4) The computer simulation is performed by using the thin-film calculation software "Essential Macleod," and then the above initial conditions specifying the multilayer structure and the values of the thicknesses of the layers are manually or automatically corrected until the multilayer structure of the negative-dispersion mirror is finally obtained.

8. Variation of Apparatus Configuration (FIG. 23)

Although it is preferable that the resonator have a linear shape, generally, the resonator may have any shape as long as the solid-state laser medium 15 is arranged in close vicinity to or in contact with the SESAM 16. In addition, although the negative-dispersion mirror in the mode-locked solid-state laser apparatus of FIG. 1 or 11 has a concave mirror, the negative-dispersion mirror may have a structure in which a multilayer is formed on a flat substrate.

Figure 23:
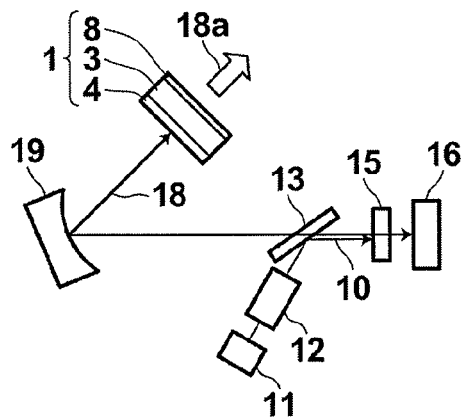
FIG. 23 is a schematic side view illustrating an exemplary configuration of a mode-locked solid-state laser apparatus according to an embodiment of the present invention.

FIG. 23 is a schematic side view illustrating an exemplary configuration of a mode-locked solid-state laser apparatus according to an embodiment of the present invention. The mode-locked solid-state laser apparatus of FIG. 23 is different from the mode-locked solid-state laser apparatus of FIG. 1 in that the mode-locked solid-state laser apparatus of FIG. 23 has a V-shaped resonator, the negative-dispersion mirror 1 (instead of the negative-dispersion mirror 5) is arranged as an output mirror, and a concave mirror 19 is arranged in the resonator so as to reflect the oscillating light 18. In the negative-dispersion mirror 1, a multilayer structure 4 is formed on a flat substrate 3.

Figure 24:
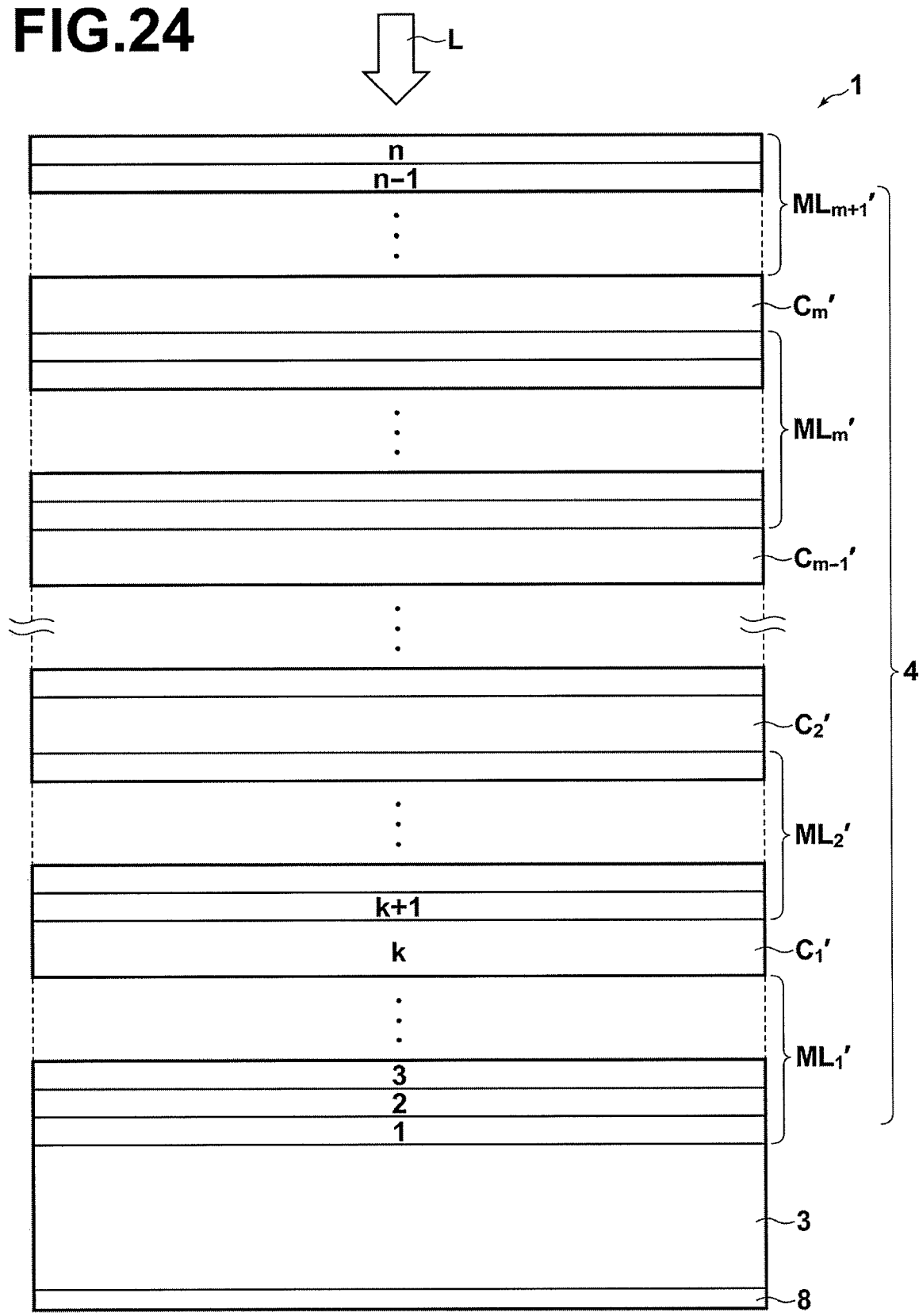
FIG. 24 is a schematic cross-sectional view of a negative-dispersion mirror used in the mode-locked solid-state laser apparatus.

FIG. 24 is a schematic cross-sectional view of an example of the negative-dispersion mirror 1 used in the mode-locked solid-state laser apparatus of FIG. 23. As illustrated in FIG.

24, the negative-dispersion mirror 1 is a mirror having a dielectric multilayer structure 4 on a flat glass substrate 3. The dielectric multilayer structure 4 is constituted by three or more multilayer mirrors $ML_1'$, $ML_2'$, ... $ML_{m+1}'$ and cavity layers $C_1'$, $C_2'$, ... $C_m'$, where m is an integer greater than one. The cavity layers $C_1'$, $C_2'$, ... $C_m'$ are arranged at predetermined intervals across the entire thickness of the dielectric multilayer structure 4 so that each of the cavity layers $C_1'$, $C_2'$, ... $C_m'$ is sandwiched between two of the three or more multilayer mirrors $ML_1'$, $ML_2'$, ... $ML_{m+1}'$ and causes resonance of the light L having the predetermined wavelength between the two of the three or more multilayer mirrors $ML_1'$, $ML_2'$, ... $ML_{m+1}'$. The negative-dispersion mirror 1 imparts a mirror dispersion of $-3000$ fsec$^2$ to $-600$ fsec$^2$ to the light L having the aforementioned wavelength, and the reflectance of the light L by the dielectric multilayer structure 4 is 97% to 99.5%. For example, in the case where the solid-state laser medium 15 is Yb:KYW, and the predetermined wavelength is 1045 nm, the three or more multilayer mirrors $ML_1'$, $ML_2'$, ... $ML_{m+1}'$ and the cavity layers $C_1'$, $C_2'$, ... $C_m'$ in the negative-dispersion mirror 1 may be arranged in the order similar to the order in which the three or more multilayer mirrors $ML_1$, $ML_2$, ... $ML_5$ and the cavity layers $C_1$, $C_2$, ... $C_4$ in one of the aforementioned concrete examples 1 to 10 are arranged, and may have optical thicknesses respectively similar to the three or more multilayer mirrors $ML_1$, $ML_2$, ... $ML_5$ and the cavity layers $C_1$, $C_2$, ... $C_4$ in one of the aforementioned concrete examples 1 to 10.

Similar to the mode-locked solid-state laser apparatus of FIG. 1, the mode-locked solid-state laser apparatus of FIG. 23 is also small in size, can be manufactured at low cost, can stably operate, and can realize continuous-wave (CW) mode locking by which pulses having a pulse width on the order of femtoseconds are generated.

What is claimed is:

1. A mode-locked solid-state laser apparatus comprising:
a resonator having an output mirror at one end of the resonator;
a solid-state laser medium arranged in said resonator; and
a saturable absorbing mirror;
wherein said solid-state laser medium is arranged at a distance equal to or smaller than twice the Rayleigh range from said saturable absorbing mirror;
said saturable absorbing mirror has a depth of absorbing modulation equal to or greater than 0.4%;
said mode-locked solid-state laser apparatus is configured to impart a total intracavity linear dispersion D to light having a predetermined wavelength during a round trip of the light in said resonator, where the total intracavity linear dispersion D is smaller than zero and the absolute value |D|, having a relationship expressed by an equation, $$|D| = \left( \frac{1.76 A_{eff,L}}{4\pi n_2 l_S} \frac{1}{0.315} \frac{c\Delta\lambda_P}{\lambda_0} \frac{1}{E_P} \right)^{-1}$$

with a light velocity c, a center wave length $\lambda_0$ of the light, a beam cross section $A_{eff,L}$ ($=\pi\omega_L^2$) of the light in the solid-state laser medium, a nonlinear refractive index $n_2$, a crystal length $l_s$ of the solid-state laser medium, and pulse energy $E_P$ in the resonator, is within a range of minimum value 0 to maximum value which is calculated from pulse bandwidth $\Delta\lambda_P$, in which $\Delta G(CW)=\Delta R/2$ and $\Delta G(DP)=\Delta R/S$ are satisfied (where, $\Delta G(CW)$ is the gain advantage of the CW background with respect to the fundamental soliton pulse, $\Delta G(DP)$ is the gain advantage of the double pulse with respect to the fundamental soliton pulse in the resonator, and S is the saturation level of the saturable absorption mirror); and
said output mirror is a negative-dispersion mirror which has a dielectric multilayer structure being formed on a substrate, including three or more multilayer mirrors and cavity layers, and having a thickness, the three or more multilayer mirrors are arranged at predetermined intervals across the thickness of the dielectric multilayer structure, each of the cavity layers is sandwiched between two of the three or more multilayer mirrors so as to cause resonance of the light between the two of the three or more multilayer mirrors, and the negative-dispersion mirror causes a mirror dispersion of $-3000$ fsec$^2$ to $-600$ fsec$^2$ and realizes a reflectance of 97% to 99.5%.

2. A mode-locked solid-state laser apparatus according to claim 1, wherein said resonator has an optical axis, and includes a dichroic mirror which transmits said light and is arranged on the optical axis or on an extension of the optical axis so that when excitation light for exciting the solid-state laser medium is injected into said resonator along a direction nonparallel to the optical axis, the excitation light is reflected by the dichroic mirror and propagates along the optical axis.

3. A mode-locked solid-state laser apparatus according to claim 1, wherein said solid-state laser medium is doped with a rare-earth element.

4. A mode-locked solid-state laser apparatus according to claim 3, wherein said rare-earth element is at least one of ytterbium (Yb), erbium (Er), and neodymium (Nd).

5. A mode-locked solid-state laser apparatus according to claim 3, wherein said solid-state laser medium is one of Yb:YAG ($Y_3Al_5O_{12}$), Yb:KYW (KY (WO$_4$)$_2$), Yb:KGW (KGd(WO$_4$)$_2$), Yb:Y$_2$O$_3$, Yb:Sc$_2$O$_3$, Yb:Lu$_2$O$_3$, Er,Yb:glass, and Nd:glass.

6. A mode-locked solid-state laser apparatus according to claim 1, wherein said resonator is a linear resonator.

7. A mode-locked solid-state laser apparatus according to claim 1, wherein said light has a mode diameter of 100 micrometers or smaller at a waist when the light is oscillated in the resonator.

8. A mode-locked solid-state laser apparatus according to claim 1, wherein said substrate of said negative-dispersion mirror has a concave surface, and said dielectric multilayer structure is arranged at the concave surface.

9. A mode-locked solid-state laser apparatus according to claim 1, wherein said negative-dispersion mirror causes said mirror dispersion of $-3000$ fsec$^2$ to $-600$ fsec$^2$ and realizes said reflectance of 97% to 99.5% in a wavelength range containing said predetermined wavelength and having a bandwidth equal to or greater than 10 nm.

10. A mode-locked solid-state laser apparatus according to claim 1, wherein said predetermined wavelength is in a wavelength range of 1000 nm to 1100 nm.

11. A mode-locked solid-state laser apparatus according to claim 1, wherein said cavity layer in said negative-dispersion mirror has an optical thickness equal to or greater than half of said predetermined wavelength.

12. A mode-locked solid-state laser apparatus according to claim 1, wherein each of layers constituting said three or more multilayer mirrors in said negative-dispersion mirror has an optical thickness equal to or greater than one-eighth of said predetermined wavelength and smaller than half of the predetermined wavelength.

13. A mode-locked solid-state laser apparatus according to claim 1, wherein said three or more multilayer mirrors in said negative-dispersion mirror are each constituted by high-index layers having relatively high refractive indexes and low-index layers having relatively low refractive indexes which are alternately laminated, and the total number of the high-index layers and the low-index layers in each of the three or more multilayer mirrors is five or greater.

14. A mode-locked solid-state laser apparatus according to claim 13, wherein said cavity layer in said negative-dispersion mirror is formed of an identical material to one of said high-index layers and said low-index layers.

15. A mode-locked solid-state laser apparatus according to claim 13, wherein said high-index layers in said negative-dispersion mirror are formed of one of a sulfide of Zn and oxides of Ti, Zr, Hf, Nb, Al, Zn, Y, Sc, La, Ce, Pr, and Ta, or a compound or mixture containing one or a combination of a sulfide of Zn and oxides of Ti, Zr, Hf, Nb, Al, Zn, Y, Sc, La, Ce, Pr, and Ta.

16. A mode-locked solid-state laser apparatus according to claim 13, wherein said low-index layers in said negative-dispersion mirror are formed of one of an oxide of Si and fluorides of Ca, Li, Mg, Na, Th, Al, Hf, La, Y, and Zr, or a compound or mixture containing one or a combination of an oxide of Si and fluorides of Ca, Li, Mg, Na, Th, Al, Hf, La, Y, and Zr.

* * * * *